United States Patent
Guzman Suarez et al.

(10) Patent No.: US 9,300,621 B2
(45) Date of Patent: Mar. 29, 2016

(54) COMMUNICATION HISTORY AGGREGATION AND PRESENTATION

(75) Inventors: Angela J. Guzman Suarez, Sunnyvale, CA (US); Peter T. Westen, Mountain View, CA (US); Jeremy D. Payne, San Jose, CA (US); Patrick L. Coffman, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 13/464,807

(22) Filed: May 4, 2012

(65) Prior Publication Data

US 2013/0204888 A1 Aug. 8, 2013

Related U.S. Application Data

(60) Provisional application No. 61/595,127, filed on Feb. 5, 2012.

(51) Int. Cl.
*G06F 17/30* (2006.01)
*H04L 12/58* (2006.01)

(52) U.S. Cl.
CPC ............... *H04L 51/36* (2013.01); *H04L 51/16* (2013.01); *H04L 51/22* (2013.01); *H04L 51/28* (2013.01)

(58) Field of Classification Search
CPC ........................................... H04L 63/08
USPC ........................................... 707/758
See application file for complete search history.

(56) References Cited

U.S. PATENT DOCUMENTS

| | | | |
|---|---|---|---|
| 7,406,501 B2 | 7/2008 | Szeto et al. | |
| 7,499,926 B1 | 3/2009 | Burckart et al. | |
| 7,941,762 B1 | 5/2011 | Tovino et al. | |
| 7,978,828 B1 | 7/2011 | Edamadaka et al. | |
| 8,706,723 B2 | 4/2014 | Huenemann et al. | |
| 2004/0015547 A1* | 1/2004 | Griffin ................ | H04L 12/1827 709/204 |
| 2004/0137884 A1 | 7/2004 | Engstrom et al. | |
| 2005/0080852 A1* | 4/2005 | Kelley et al. ................... | 709/206 |
| 2006/0101119 A1* | 5/2006 | Qureshi et al. ................ | 709/206 |
| 2007/0099657 A1* | 5/2007 | Scott ................ | H04M 1/72552 455/556.2 |
| 2007/0168446 A1 | 7/2007 | Keohane et al. | |
| 2008/0059627 A1 | 3/2008 | Hamalainen et al. | |
| 2008/0165148 A1 | 7/2008 | Williamson et al. | |
| 2008/0174570 A1 | 7/2008 | Jobs et al. | |

(Continued)

FOREIGN PATENT DOCUMENTS

WO 2008/030967 A2 3/2008

OTHER PUBLICATIONS

Invitation to Pay Additional Fees mailed on Jun. 3, 2013 for PCT Patent Application No. PCT/US2013/024653, 5 pages.

(Continued)

*Primary Examiner* — Mariela Reyes
*Assistant Examiner* — Courtney Harmon
(74) *Attorney, Agent, or Firm* — Morgan, Lewis & Bockius LLP

(57) ABSTRACT

A unified communication application can allow a user to communicate with contacts across multiple electronic communication services. The unified communication application can aggregate communication history between the user and another person. A set of communication files associated with user identifiers of the user and the other person can be obtained, arranged, and presented to the user in an order based on a timestamp of each conversation line in the files.

30 Claims, 11 Drawing Sheets

(56) References Cited

U.S. PATENT DOCUMENTS

| | | | |
|---|---|---|---|
| 2008/0189399 A1* | 8/2008 | Quoc et al. ............... | 709/223 |
| 2009/0048845 A1 | 2/2009 | Burckart et al. | |
| 2009/0088189 A1 | 4/2009 | Hardy et al. | |
| 2009/0327422 A1* | 12/2009 | Katis ............... | H04L 12/1827 709/204 |
| 2012/0151377 A1* | 6/2012 | Schultz et al. ............ | 715/751 |
| 2012/0231770 A1* | 9/2012 | Clarke et al. ............ | 455/414.1 |
| 2013/0007122 A1 | 1/2013 | Su | |
| 2013/0097546 A1 | 4/2013 | Gärdenfors et al. | |
| 2013/0204888 A1 | 8/2013 | Guzman Suarez et al. | |
| 2013/0204947 A1 | 8/2013 | Guzman Suarez et al. | |
| 2013/0227031 A1 | 8/2013 | Wells | |

OTHER PUBLICATIONS

Non-Final Office Action mailed on Jun. 10, 2014 for U.S. Appl. No. 13/464,801, 19 pages.

International Search Report and Written Opinion mailed on Nov. 26, 2013 for PCT Patent Application No. PCT/US2013/024653, 18 pages.

International Preliminary Report on Patentability for International PCT Application No. PCT/US2013/024653, mailed Aug. 14, 2014, 12 pages.

Final Office Action, dated Februrary 27, 2015, received in U.S. Appl. No. 13/464,801, 14 pages.

Office Action, dated Mar. 5, 2015, received in Australian Patent Application No. 2013214758, which corresponds to U.S. Appl. 13/464,801, 3 pages.

Office Action, dated Aug. 31, 2015, received in U.S. Appl. No. 13/464,801, 20 pages.

Office Action, dated Jun. 8, 2015, received in Korean Patent Application No. 10-2014-7025098, which corresponds to U.S. Appl. No. 13/464,801, 4 pages.

* cited by examiner

FIG. 5

|  |  | 500 |
|---|---|---|

| Johnny Appleseed | 502 |
|---|---|
| Mobile: | 408-555-1234 — 510 |
| Work Email: | j2a@company.com — 506 |
| Home Email: | johnnya@home.com — 508 |
| Home Address: | 1000$^{th}$ St., Cupertino, CA — 504 |
| Home: | jappleseed01           AIM — 512 |
| Home: | ja1990           Skype — 518 |
| Work: | johnny@co.com           Jabber — 514 |
| Other: | j-appleseed           Yahoo! — 516 |
| Group: | Coworker — 520 |

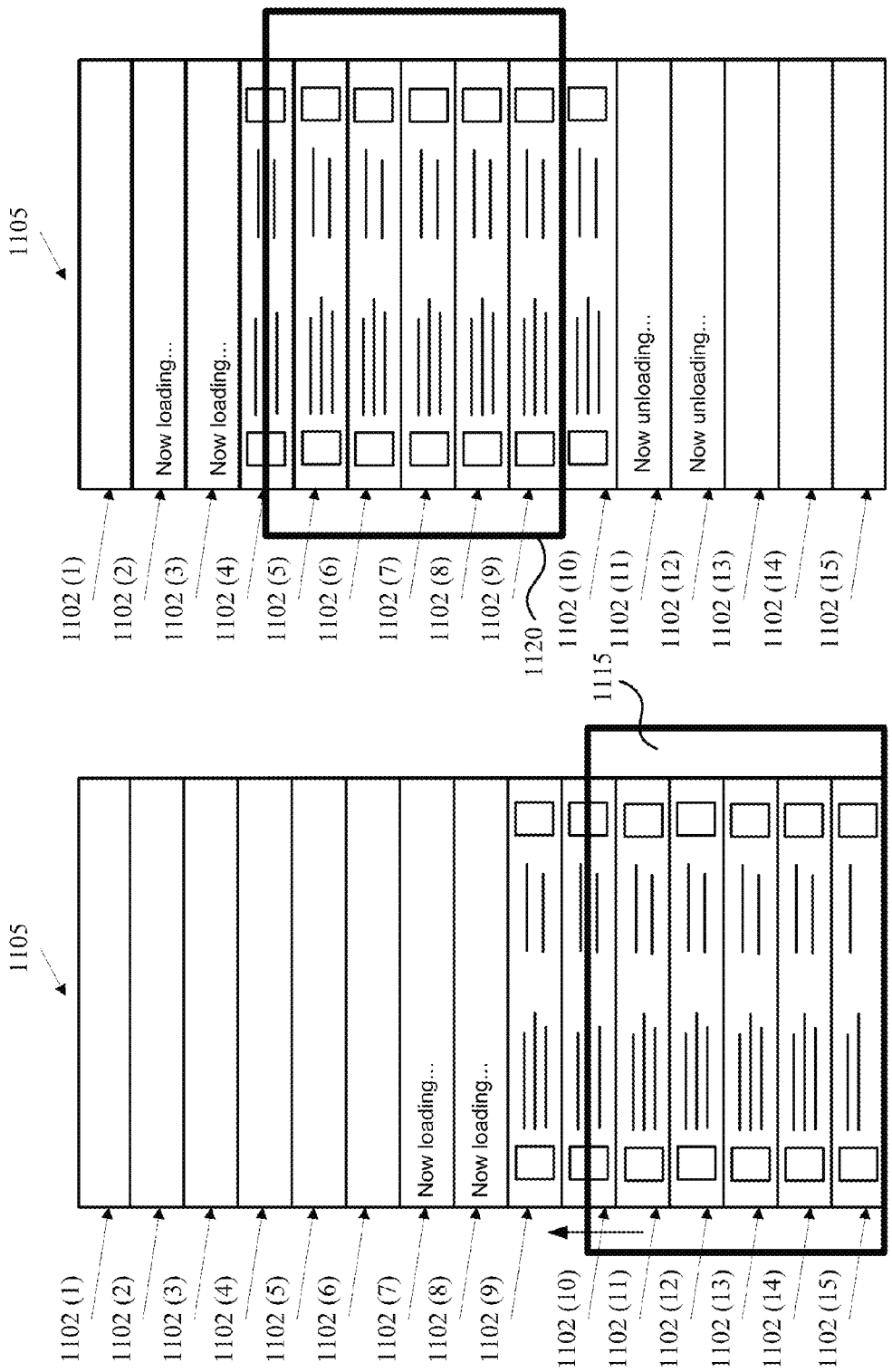

COMMUNICATION HISTORY AGGREGATION AND PRESENTATION

CROSS-REFERENCES TO RELATED APPLICATIONS

This application claims priority to and the benefit of U.S. Provisional Application No. 61/595,127, filed Feb. 5, 2012 and entitled "Unified Communication Application," the entire disclosure of which is herein incorporated by reference for all purposes.

BACKGROUND

The present disclosure relates in general to facilitating a communication session in an electronic environment, and in particular to determining participant accounts of a communication session, as well as aggregating communication history to enable a user to view the communication history with another person.

Typically, in order to initiate an electronic communication session, a user can log into an instant messaging service using a username and a password. After the user logs into the instant messaging service, the user can view a contacts list that shows the status of the user's established contacts on that service. When the user desires to establish a communication session with a particular contact on the user's contacts list, the user can select, an identifier representing the particular contact, or the intended recipient, from the user's contacts list, create a message in a message box that appears when the user selects the identifier, and send the message to the recipient. Upon receiving the message, the recipient can either respond to the sender or decline to respond. If the recipient responds to the sender, a communication session is established and communication between the sender and the recipient (referred to as "participants of the communication session") begins. In some instances, the participants of the communication session can invite other contacts to join the communication session.

A number of instant messaging services have become widespread, with some being more popular with certain groups of users. Users are often registered with several instant messaging services and communicate with other users who are also registered with a number of instant messaging services, some of instant messaging services of which do not overlap. Moreover, users registered with several instant messaging services often have different usernames for some of those services. A user can have trouble keeping track of which contacts are on which services and under which usernames.

In some instances, a user can be logged into several instant messaging services. If the user is not currently logged into a service that an intended recipient is currently using, the user must log into that service before the user is able to send messages to the intended recipient. In other instances, a user can be logged into several instant messaging service but only actively using some of those services. If the user is not currently actively using the service that the intended recipient is using, then the user must switch to the service that the intended recipient is using to be able to send messages to the intended recipient. It can be cumbersome for the user to constantly have to log into and/or switch between different services when the user desires to communicate with different contacts.

Further, the user might desire to view a communication history with another user. For instance, the user might be searching for a particular dialogue between the user and another user. However, with, each user having multiple usernames associated with multiple instant messaging services, it can be difficult to find the particular dialogue.

SUMMARY

Certain embodiments of the present invention relate to a unified communication application that enables a user of the application to view a communication history between the user and another person. The communication history can include any communication between the user and the other person regardless of the different user identifiers and the electronic communication services they have used to communicating with each other. Upon receiving a request for a communication history between the user and the other person, the unified communication application obtains a set of communication session files that store communications between the user and the other person. Each of the communication session files can include a set of conversation lines that are each associated with a timestamp. In some embodiments, the conversation lines in different communication session files may have been transmitted using different ones of several electronic communication services. The unified communication application arranges the conversation lines from all of the set of communication session files in an order based on the associated timestamps and presents at least a portion of the arranged conversation lines to the user.

Certain other aspects of the invention relate to methods for aggregating a communication history between two or more users. A unified communication application can receive a request for a communication history between a user and another person. The unified communication application can obtain a set of communication session files that stores communications between the user and the other person. In some embodiments, each of the set of communication session files can include a set of conversation lines that can be each associated with a timestamp. The conversation lines in different ones of the set of communication session files may have been transmitted using different ones of multiple electronic communication services. The unified communication application can arrange the conversation lines from all of the set of communication session files in an order based on the associated timestamps. The unified communication application can present at least a portion of the arranged conversation lines to the user.

The following detailed description together with the accompanying drawings will provide a better understanding of the nature and advantages of the present invention.

BRIEF DESCRIPTION OF THE DRAWINGS

FIG. 5 illustrates an example of a contact entry in the database of user contacts and its associated information.

FIGS. 11A and 11B are representations of a communication history page at two different times illustrating dynamically loading and unloading portions of a page according to an embodiment of the present invention.

DETAILED DESCRIPTION

Figure 1:
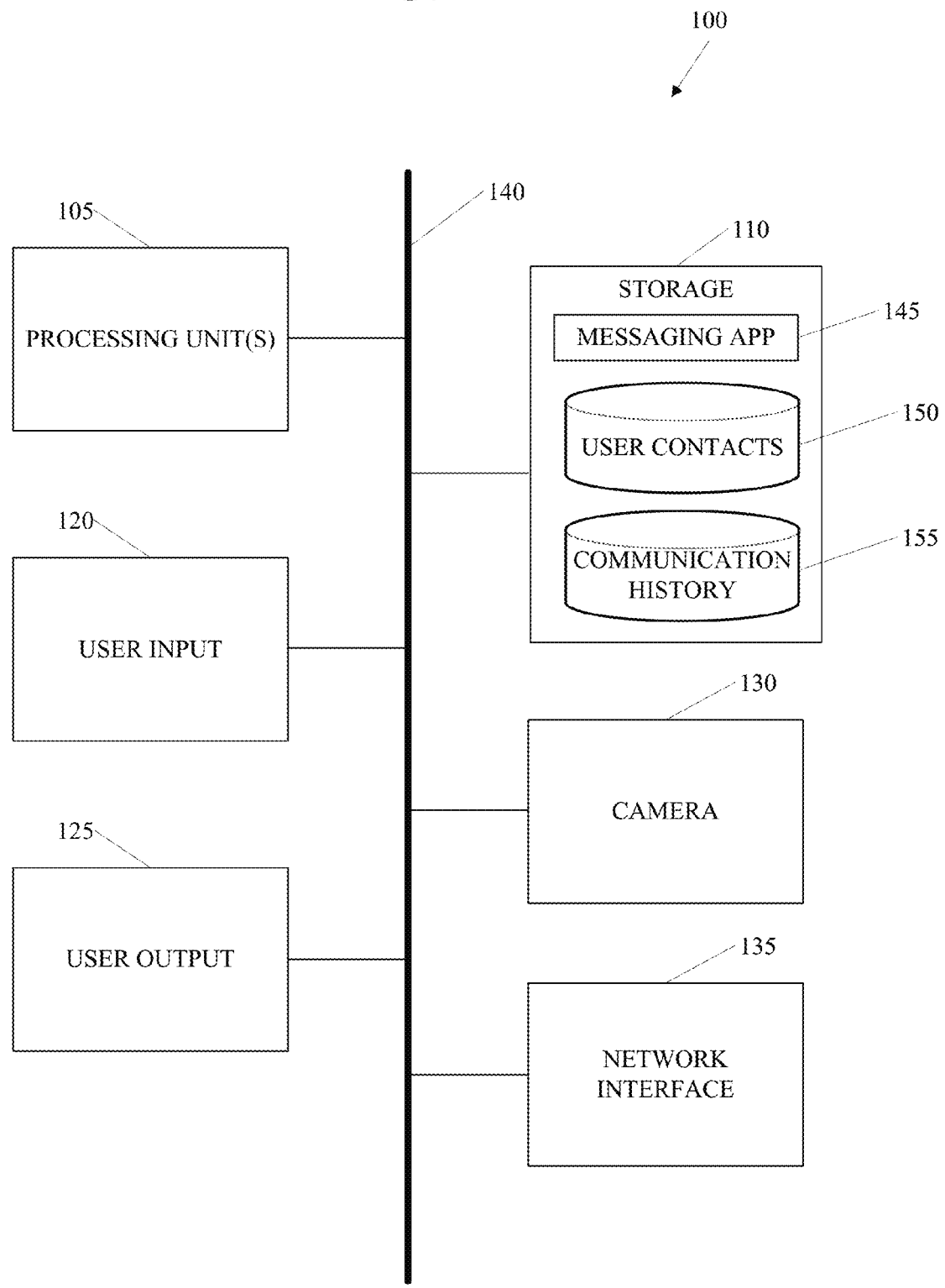
FIG. 1 illustrates a computer system according to an embodiment of the present invention.

Certain embodiments of the present invention relate to a unified communication application (also referred to as "a unified messaging application") that performs participant account determination for an electronic communication session. In some embodiments, the unified communication application is a single application that allows a user to send and receive messages using any of a number of different electronic communication services. The user can identify an intended recipient with whom the user would like to communicate by inputting a partial identifier of the intended recipient. In response to receiving the user input, the unified communication application on the user's electronic device searches, based on the partial identifier, a database of user contacts to identify account addresses for a number of candidate recipients. The account addresses can include account identifiers that are associated with several electronic communication services. The user device can present a list that includes the set of candidate account identifiers to enable the user to select an identifier of the intended recipient. Upon receiving a user selection of the identifier, the user device can determine, based on the electronic communication service associated with the identifier, the sender account from which to send the message. The user device can then send the message to the intended recipient using the determined sender account.

Further, some embodiments of the invention enable a user of a unified communication application to view a communication history between the user and another person. The communication history can include any communication between the user and the other person regardless of the different user identifiers and the electronic communication services they have used to communicating with each other. Upon receiving a user indication that the user would like to view a communication history between the user and the other person, the unified communication application obtains a set of communication session files that store communications between the user and the other person. Each of the communication session files can include a set of conversation lines that are each associated with a timestamp. In some embodiments, the conversation lines in different communication session files may have been transmitted using different ones of several electronic communication services. The unified communication application arranges the conversation lines from all of the set of communication session files in an order based on the associated timestamps and presents at least a portion of the arranged conversation lines to the user.

The term "electronic communication service" is used herein to refer to any service capable of facilitating communication among a group of users who have accounts on that service (e.g., by providing a communication platform via an application such as an instant messaging computer program). An electronic communication service can provide communication over various channels, including e-mail, instant messaging (IM), Short Message Service (SMS), Voice over Internet Protocol (VoIP), etc. Examples of different electronic communication services can include AIM®, iChat®, Google® Talk, Skype®, Viber®, etc. A number of electronic communication services can provide real time communication between registered users. The types of communication between the users can include audio, video, image, and text communications.

As used herein, an electronic communication service defines a "closed universe" within which any user with an account on the service can send a communication to any other user with an account on the same service. (Some services may allow users to block other users from communicating with them or select specific users whose communications they wish to receive.) In some embodiments, an electronic communication service can be platform-independent or platform-dependent. Electronic communication services that are platform-independent, such as e-mail services, allow users to send communications to other users across different servers regardless of the e-mail provider. For example, Yahoo!® Mail and Gmail®, as well as other e-mail services, are platform-independent: any user with a valid e-mail account on any server can send e-mail to any other user on any other e-mail, server. Therefore, in the context of the present disclosure, all Internet-based e-mail services are considered to constitute a single electronic communication service. In contrast, instant messaging or chat services such as AIM®, Yahoo!® Messenger, and Skype® are platform-dependent services where the users of one service cannot use their accounts to communicate with user accounts on another service. Hence, in the context of the present disclosure, most Internet-based messaging services are considered to be different electronic communication services.

The term "account address" is used herein to refer to any account on any electronic communication service. An account address can include a user identifier (e.g., a username, handle, alias, number, or the like) and an identifier of the electronic communication service where the user identifier is valid. A single user can have one or more user identifiers across multiple electronic communication services and can have multiple user identifiers on a single service. Accounts or account addresses for a single user on different services might or might not have the same user identifier.

A unified messaging application can allow a user to access, from within a single user interface, all of the electronic communication services on which she has accounts. In some embodiments, the user can operate the messaging interface to send and receive e-mails, conduct text-based and/or video "chat" sessions, send and receive text messages, etc.

FIG. 1 illustrates a computer system 100 according to an embodiment of the present invention. Computer system 100 can be implemented as any of various electronic computing devices, including, e.g., a desktop or laptop computer, a tablet computer, smart phone, personal data assistant (PDA), or any other type of computing device, not limited to any particular form factor. Computer system 100 can include processing unit(s) 105, storage subsystem 110, input devices 120, output devices 125, camera 130, network interface 135, and bus 140.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASIC's) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computer system 100. The permanent storage device can be a read-and-write memory device. This permanent storage device can be a non-volatile memory unit that stores instructions and data even when computer system 100 is powered down. Some embodiments of the invention use a mass-storage device (such as a magnetic or optical disk or flash memory) as the permanent storage device. Other embodiments use a removable storage device (e.g., a floppy disk, a flash drive) as a permanent storage device. The system memory can be a read-and-write memory device or a volatile read-and-write memory, such as dynamic random access memory. The system memory can store some of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105, such as a communication application 145 (also referred to as "unified messaging app" 145). "Software" refers generally to sequences of instructions that, when executed by processing unit(s) 105 cause computer system 100 to perform various operations, thus defining one or more specific machine implementations that execute and perform the operations of the software programs. The instructions can be stored as firmware residing in read-only memory and/or applications stored in magnetic storage which can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieve program instructions to execute and data to process in order to execute various operations described herein. In some embodiments, storage subsystem 110 can also store other data, such as a database of user contacts 150 and/or communication history session files 155.

A user interface can be provided by one or more user input devices 120 and one or more user output devices 125. Input devices 120 can include any device via which a user can provide signals to computer system 100; computer system 100 can interpret the signals as indicative of particular user requests or information. Input devices 120 can include any or all of a keyboard, touch pad, touch screen, mouse or other pointing device, scroll wheel, click wheel, dial, button, switch, keypad, microphone, and so on.

Output devices 125 display images generated by computer system 100. Output devices 125 can include a various image generation technologies (e.g., a cathode ray tube (CRT), liquid crystal display (LCD), light-emitting diode (LED) including organic light-emitting diodes (OLED), projection system, or the like), together with supporting electronics (e.g., digital-to-analog or analog-to-digital converters, signal processors, or the like), indicator lights, speakers, headphone jacks, printers, and so on. Some embodiments can include a device such as a touchscreen that function as both input and output device.

In some embodiments, the output device 125 can provide a graphical user interface, in which visible image elements in certain areas of the output device 125 are defined as active elements or control elements that the user selects using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in output device 125. Other user interfaces can also be implemented.

Camera 130 captures images (e.g., as RAW image data or compressed image data). Camera 130 can be integrated into a device with processing unit(s) 105, etc., or can be a separate device that is communicatively coupled to the device with processing unit(s) 105. Camera 130 can allow computer system 100 to capture and record video and still images from the surrounding environment. Camera 130 can be of conventional design, including optical components (lenses, filters, etc.), a photo sensor (e.g., a CMOS sensor with millions of independent pixels), and associated electronics for converting signals generated by the sensor to digital image data.

Network interface 135 can provide voice and/or data communication capability for computer system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computer system 100. For example, bus 140 can communicatively couple processing unit(s) 105 with storage subsystem 110. Bus 140 can also connect to input and output devices 120 and 125. Bus 140 can also couple computer system 100 to a network through network interface 135. In this manner, computer system 100 can be a part of a network of multiple computer systems (e.g., a local area network (LAN), a wide area network (WAN), an Intranet, or a network of networks, such as the Internet). Any or all components of computer system 100 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computer system 100. For example, processing unit(s) 105 can execute communication application 145 (or "unified messaging app" 145). Unified messaging app 145 can provide various functionality such as instant messaging features, video and voice communication features, e-mail features, etc. In some embodiments, unified messaging app 145 can identify a set of account addresses associated with multiple electronic communication services in response to receiving a partial identifier for an intended recipient from a sender. Unified messaging app 145 can also determine a sender account from which to send the message to the intended recipient upon receiving user selection of an identifier for the intended recipient, from the set of account addresses.

Further, in some embodiments, unified messaging app 145 can allow the user to view communication history between the user and another user. Upon receiving a user indication that the user would like to view communication history between the user and another user, unified messaging app 145 can identify all the user identifiers of the user and of the other user across multiple electronic communication services, obtain access to communication history files associated with those user identifiers, sort the content within the communication history files, and aggregate the sorted content into a single page for display to the user. In some embodiments, the user can scroll across the page to view the communication history that includes communications between the two users from multiple communication services. Moreover, messaging app 145 of some embodiments can include program instructions to assist a user in operating camera 130 to capture and analyze hand gestures or gaze or facial movements as a type of user input.

It will be appreciated that computer system 100 of FIG. 1 is illustrative and that variations and modifications are possible. Computer system 100 can have other capabilities not specifically described here (e.g., mobile phone, global positioning system (GPS), power management, accessory connectivity, etc.). Further, while computer system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

As mentioned, computer system 100, hereinafter also referred to as user device 100, can provide a single unified messaging app 145 that allows a user to communicate with contacts across multiple electronic communication services. In response to receiving a user indication of an intended recipient, user device 100 in some embodiments can populate a list of candidate account addresses that can include user identifiers associated with multiple electronic communication services. The user (in this case, the sender) can select a user identifier for a recipient from the populated list to initiate a communication session with the recipient. The service to be used can be automatically determined based on the user's selection. Examples of such process will now be described.

Figure 2:
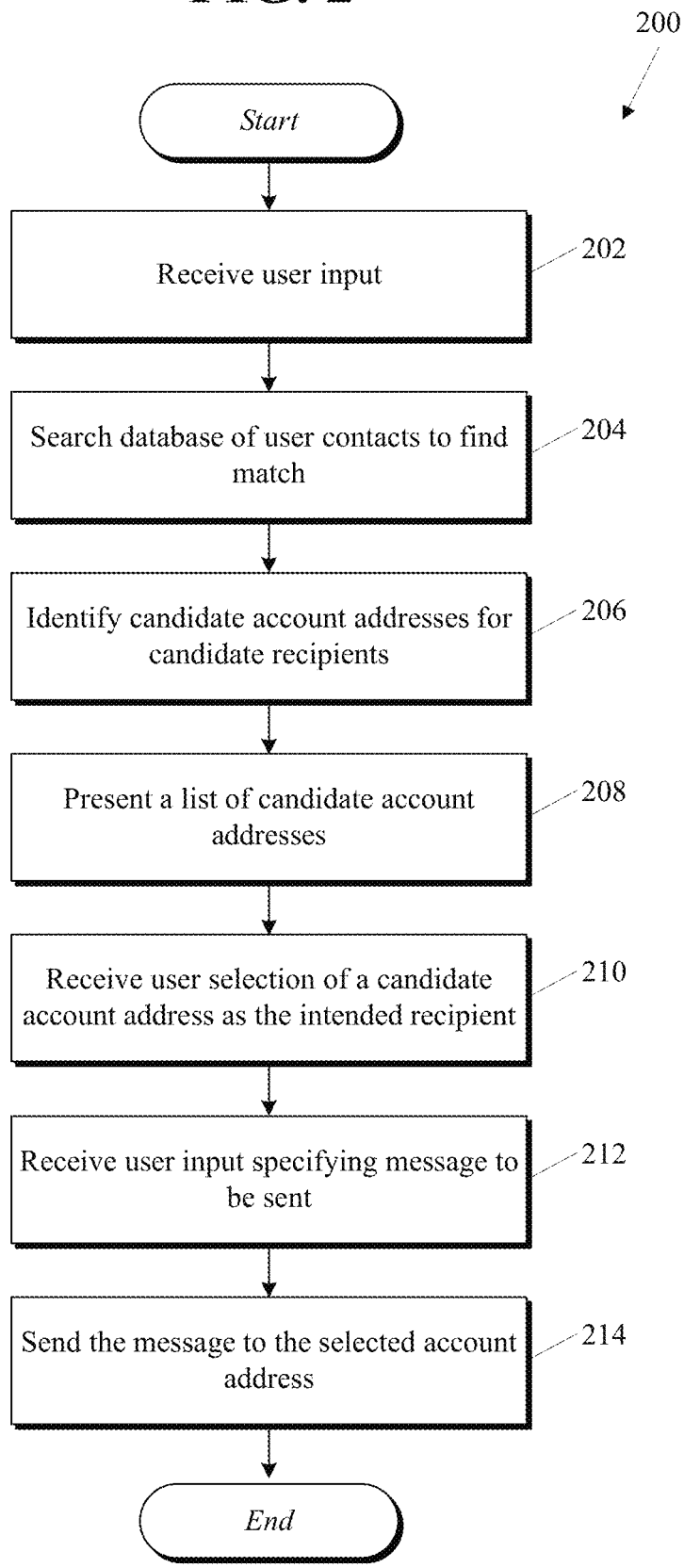
FIG. 2 is a flow diagram of a process for facilitating a communication session according to an embodiment of the present invention.

FIG. 2 is a flow diagram of a process 200 for facilitating a communication session according to an embodiment of the present invention. Process 200 can be implemented, e.g., in user device 100 of FIG. 1 executing unified messaging app 145. Process 200 will be described with reference to FIG. 3, which illustrates an example sequence of screen images for user device 100 in setting up a communication session with an intended recipient using unified messaging app 145 according to an embodiment of the invention.

At block 202 of FIG. 2, unified messaging app 145 can receive a user input including a partial identifier for an intended recipient of a message to be sent by a sender. In some embodiments, the partial identifier can be a portion of a contact's first name, a portion of a contact's last name, a portion of one of a contact's usernames or aliases, etc. Some embodiments allow the sender to perform the user input through a keyboard input, a gesture input, a cursor controller input, a gaze input, a voice command, etc.

Figure 3:
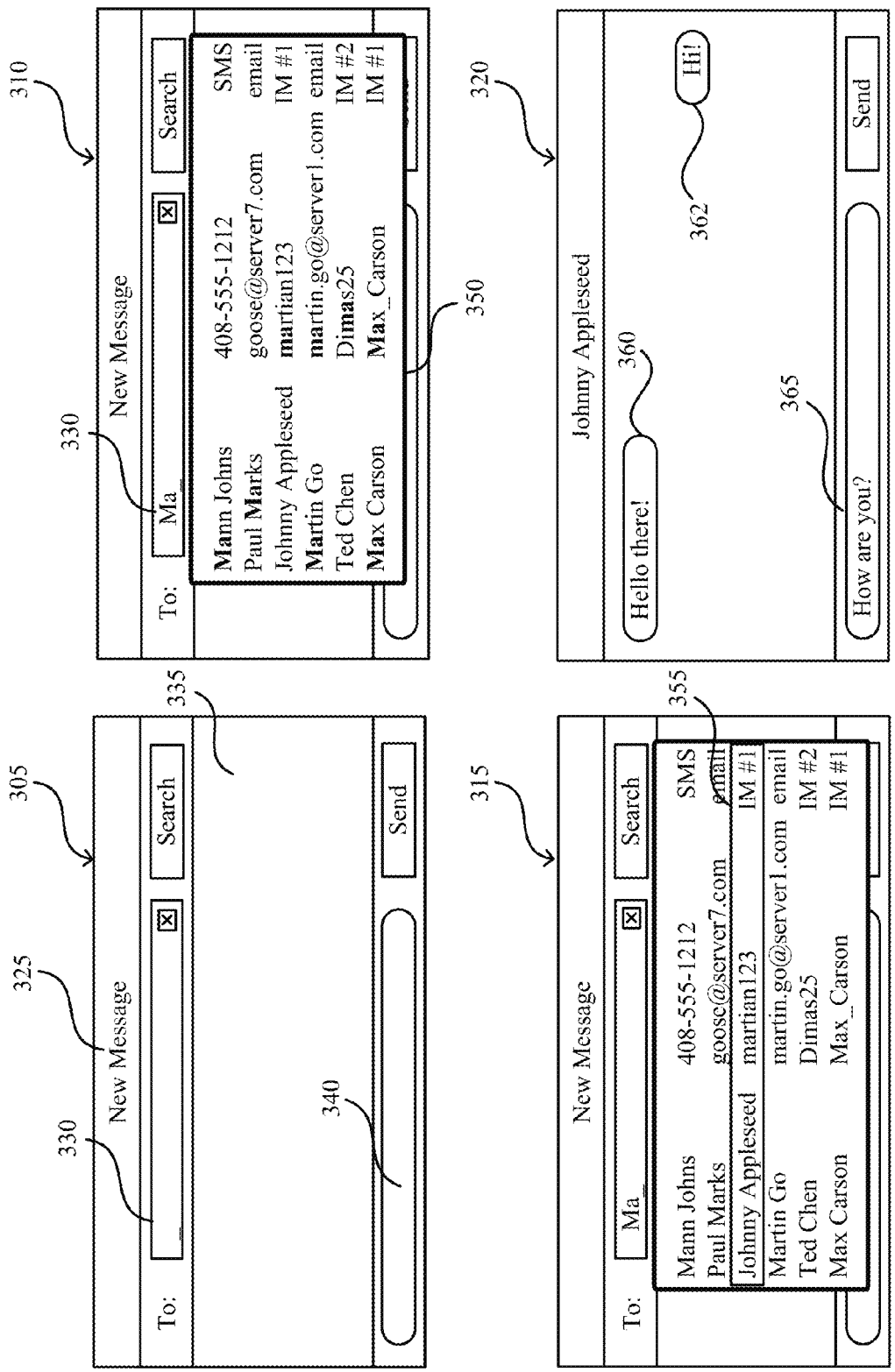
FIG. 3 illustrates an example sequence of screen images for setting up a communication session with an intended recipient according to an embodiment of the invention.

Referring to FIG. 3, an initial screen 305 can be associated with a communication application (e.g., unified messaging app 145). Initial screen 305 includes a description section 325, a search box 330, a communication exchange display area 335, and a message entry box 340. Description section 325 indicates that the user is in the process of creating a new message to be sent to an intended recipient for a communication session. Search box 330 allows the sender to input a sequence of characters (e.g., a portion of a first name, a last name a nickname, etc.) to identify the intended recipient. Communication exchange display area 335 displays the communication exchange between the sender and the recipient, which can include various text data, hyperlinks, image data, video data, audio data, etc. Text entry box 340 allows the sender to enter a message that the sender would like to communicate to the recipient.

Referring again to FIG. 2, at block 204, unified messaging app 145 can search a database of user contacts to determine whether a match with the user input exists. In some embodiments, the database of user contacts can include an electronic address book stored locally on user device 100. In some embodiments, the database of user contacts can include an electronic address book stored at a remote server accessible by user device 100. The electronic address book can store a number of contacts and their information (e.g., first name, last name, e-mail address, phone number, address, gender, instant messaging user identifiers, etc.). User device 100 in some embodiments determines whether a match with the user input exists by comparing the partial identifier with first names of contacts in the electronic address book, with last names of contacts in the electronic address book, with e-mail addresses of contacts in the electronic address book, with instant messaging account identifiers, etc. This enables the user device 100 to identify a number of contacts who match the partial identifier.

In some embodiments, unified messaging app 145 can determine whether a match with the user input exists by comparing the partial identifier with one or more instant messaging user identifiers in a service-specific contacts list. In some embodiments, a user can have a service-specific contacts list for some or all of the electronic communication services with which the user is registered. Each service-specific contacts list (e.g., a "buddy list" on some IM services) can include a number of user identifiers for other users on the same service with whom the user communicates (e.g., a "buddy list" on some instant-messaging services). While in some embodiments, the service-specific contacts list can be stored locally on user device 100, the service-specific contacts list in some embodiments can be stored in a remote server managed by a provider of the associated communication service. Some embodiments perform this comparison against instant messaging identifiers only when a match was not identified when the partial identifier was compared against the first names and/or last names of contacts in the user's electronic address book. Some embodiments perform this comparison regardless of whether a match was found in the address book.

At block 206, unified messaging app 145 can identify a set of candidate account addresses for a set of candidate recipients. Each candidate account address can include a user identifier and an identifier of the electronic communication service where the user identifier is valid. At block 208, unified messaging app 145 can present a list of candidate account addresses to the sender. In some embodiments, the list can be displayed on a screen image displayed on a display screen of user device 100. Some embodiments can present the list to the sender by generating audio signals that delivers the list to the sender.

In screen image 310 of FIG. 3, the sender has input the letters "Ma" into search box 330. In response to this user input, unified messaging app 145 has identified candidate recipients and has presented a list 350 to the user. List 350 can include accounts on any electronic communication service.

In this example, unified messaging app 145 has identified a contact Mann Johns as one of the candidate recipient accounts based on the contact's first name. Unified messaging app 145 further shows Mann Johns' telephone number (310-555-1212) and indicates that he is reachable via SMS. Unified messaging app 145 has identified a contact Paul Marks as another one of the candidate recipient accounts based on the contact's last name. Unified messaging app 145 shows Paul Marks's e-mail address (goose@server7.com) and indicates that he is reachable via e-mail. Unified messaging app 145 has identified a contact Johnny Appleseed as another one of the candidate recipient accounts based on the contact's user identifier "martian123" on a particular instant messaging service. Unified messaging app 145 shows Johnny Appleseed's messaging user identifier "martian123" and indicates that he is reachable via instant messaging service 1 ("IM #1"). Unified messaging app 145 has also identified a contact Martin Go as a candidate recipient account based on the contact's e-mail address. Unified messaging app 145 has also identified a contact Ted Chen as one of the candidate recipient accounts based on the contact's messaging user identifier. Unified messaging app 145 has further identified a contact Max Carson as one of the candidate recipient accounts based on the contact's messaging user identifier.

List 350 includes the set of candidate account addresses and can also include related information (e.g., a name corresponding to a candidate account address, an associated electronic communication service, etc.) that would help the sender identify the intended recipient.

In some cases, there can be several available options for communicating with a single recipient (e.g., IM #1, IM #2, SMS, VoIP, etc.). For example, the user input may match the first name of a contact for whom the user's address book has a phone number, an e-mail address, and two different instant messaging account addresses that may belong to the same recipient or different recipients. In some embodiments where multiple services are available for a single recipient, unified messaging app 145 can select and display a most preferred communication service that is available for communicating with the candidate recipient. The preferences in communication service can be pre-configured by the manufacturer or configured by the user in a preferences setting on unified messaging app 145. In some embodiments, the preferred service can be determined dynamically, e.g., based on the sender's past communication behavior.

In some embodiments, instead of displaying only the most preferred communication service available for communicating with the candidate recipient, unified messaging app 145 can display all the accounts for the candidate recipient. In some embodiments, unified messaging app 145 can display the different accounts for the recipient in an order based on the user's preference. For example, if the user typically prefers to use SMS, then if SMS is available as a means of communicating between the user and the candidate recipient, then this option would be displayed at the top of the list for the user's convenience. As another example, the order can be based on how often the sender has used each of the accounts.

Returning to FIG. 2, at block 210, unified messaging app 145 can receive a user selection of one of the candidate account addresses for the intended recipient. Alternatively, the sender can input more information (e.g., continuing to enter additional characters) to further filter the list of candidate recipient accounts. In screen image 315 of FIG. 3, the sender has selected one of the candidate account addresses for the intended recipient, and the selected candidate account address 355 is highlighted. In some embodiments, the sender can select more than one candidate account address from the same list.

Returning to FIG. 2, at block 212, unified messaging app 145 can receive a user input specifying a message to be sent. In some embodiments, the user can type a message into text entry box 340 of FIG. 3. Unified messaging app 145 can also allow the user to create message content by identifying a file that contains message content (e.g., a photo), by launching a video or audio chat (if the selected service supports this) and providing user input via a microphone and/or camera, etc.

At block 214, unified messaging app 145 can send the specified message to the selected account address. In some embodiments, sending the message can include selecting the appropriate sender account to use. The sender can have multiple sender account addresses that each include a user identifier and an identifier of the electronic communication service where the user identifier is valid. In some embodiments, unified messaging app 145 can allow the sender to specify which sender account address the sender would like to use prior to sending the message. Unified messaging app 145 of some embodiments can automatically determine a sender account address without human intervention, based on a number of decision criteria, examples of which are described below. Upon determining the sender account address, a communication session can be established between the sender and the intended recipient.

As shown in screen image 320 of FIG. 3, a communication session, in this case, a chat session, has been established and the sender is able to send instant messages to the recipient. Message 360 has been sent, a reply 362 has been received, and the sender is currently typing message 365. In some embodiments, unified messaging app 145 animates the manner in which the messages are displayed on the screen images. For instance, as the sender instructs unified messaging app 145 to send the message to the recipient (e.g., by selecting a "send" button), the message can move from message entry box 340 to communication exchange display area 335 in an animated bubble movement, appearing as if the text were in a bubble traveling upward. Various animation schemes and styles can be incorporated into displaying the messages of the sender and recipient. Although the sender is using instant messages to communicate with the recipient in this instance, in some instances, the sender can send other types of messages including text messages, audio messages, video messages, e-mail messages, etc. to the recipient. Like all other input, the messages can be created using a keyboard input, voice command input, gesture input, etc.

Figure 4:
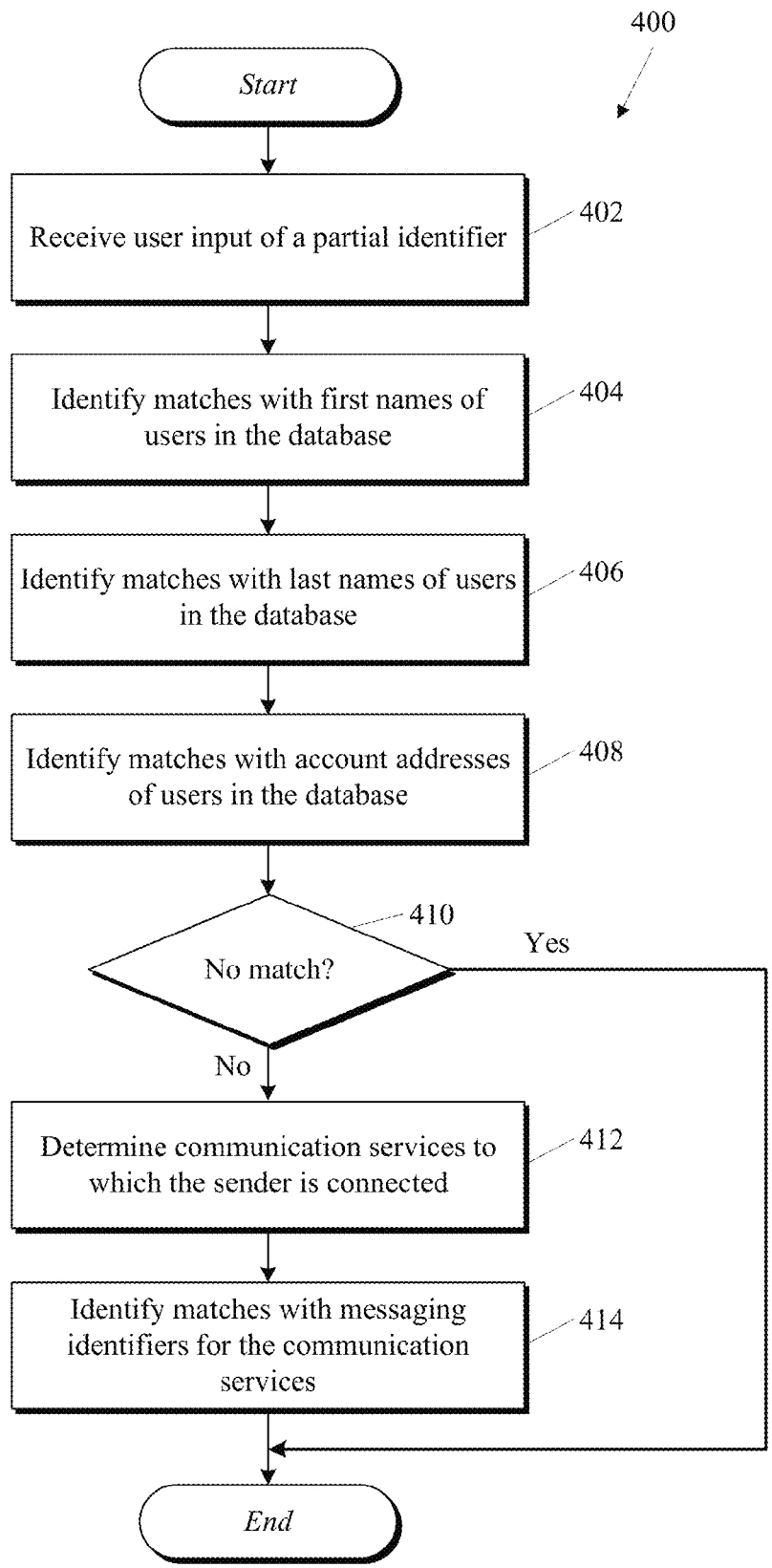
FIG. 4 is a flow diagram of a process for identifying a set of candidate account addresses for a set of candidate recipients according to an embodiment of the present invention.

As described above, unified messaging app 145 can search various sources to identify candidate account addresses and candidate recipients. FIG. 4 is a flow diagram of a process 400 for identifying a set of candidate account addresses for a set of candidate recipients according to an embodiment of the present invention. Process 400 can be implemented, e.g., in user device 100 of FIG. 1 executing unified messaging app 145. Process 400 will be described with reference to FIG. 5, which illustrates an example of a contact entry 500 in a database of user contacts (e.g., user contacts database 150 of FIG. 1) in accordance with some embodiments of the invention.

At block 402, unified messaging app 145 can receive user input including a partial identifier. The partial identifier can be any information that would enable unified messaging app 145 to narrow down contacts in the database of user contacts and identify a set of candidate account addresses. In some embodiments, the partial identifier can be a sequence of characters that can identify a portion of a name, an e-mail address, an instant messaging user identifier, etc.

At block 404, unified messaging app 145 can identify one or more matches with first names of contacts in user contacts database 150. For example, unified messaging app 145 can match the partial identifier with first names in user contacts database 150 to identify matching first names. In some embodiments, unified messaging app 145 can identify a first name as a match with the partial identifier if any portion of the first name is the same as the partial identifier. For example, unified messaging app 145 can determine that "Madonna" is a match for partial identifier "Don." In some embodiments, unified messaging app 145 can identify a first name as match with the partial identifier only when the initial characters of the first name matches the partial identifier. For example, unified messaging app 145 can determine that "Larry" is a match for partial identifier "La" while "Mandela" is not. The settings for how a match is determined can be preconfigured or can be configurable by an administrator or a user of the communication application.

FIG. 5 illustrates an example of a contact entry 500 in the database of user contacts and its associated information. As shown, contact entry 500 can include the contact's name (at 502) and a list of addresses at which the contact can be reached. These addresses can include physical addresses (e.g., home address 504) as well as account addresses on various electronic communication services. In this example, Johnny Appleseed's account addresses include two e-mail addresses 506 and 508, an SMS address 510 (in the case of SMS, a phone number can function as an account identifier), three addresses for instant-messaging services 512, 514, and 516, and a VoIP address 508. Contact entry 500 can also include other information about the contact (shown in area 520), such as one or more user-assigned group affiliations of the contact. In response to receiving the user input, unified messaging app 145 can compare the partial identifier to the first names of contacts in user contacts database 150. If the user input is "John," unified messaging app 145 of some embodiments can determine that a match has been found and flag contact entry 500.

Returning to FIG. 4 at block 406, unified messaging app 145 can identify one or more matches with last names of contacts in user contacts database 150. For example, unified messaging app 145 matches the partial identifier with a set of last names in user contacts database 150 to identify matching last names. In some embodiments, unified messaging app 145 can identify a last name as a match with the partial identifier if any portion of the last name is the same as the partial identifier. In some embodiments, unified messaging app 145 can find a match only when the first portion of the last name matches the partial identifier.

At block 408, unified messaging app 145 can identify one or more matches with account addresses of contacts in user contacts database 150. In some embodiments, unified messaging app 145 can match the partial identifier with any of the account addresses of a contact.

In FIG. 5, unified messaging app 145 can compare the account addresses (including the e-mail addresses "j2a@company.com" and "johnnya@home.com"; the SMS address "408-555-1234"; and the instant-messaging addresses "jappleseed01," "ja1990," "johnny@co.com," and "j-appleseed") against the partial identifier to determine whether a match is found. Upon identifying a match, unified messaging app 145 can flag the account address. In some embodiments, some or all of a contact's phone numbers can be treated as SMS addresses, and a user can find a contact by entering part of the contact's phone number.

Returning to FIG. 4 at block 410, unified messaging app 145 can determine whether a match has been found. Unified messaging app 145 determines whether there is at least one match between the partial identifier and a first name, a last name, or an account address in user contacts database 150. If at least one match exists, a list of candidate account addresses including the matching first names, last names, e-mail addresses, and/or messaging identifiers can be presented to the sender. The sender can then select one of the account addresses from the list and send a message to the selected recipient via the electronic communication service associated with the selected account address.

If unified messaging app 145 determines that a match has not been found, at block 412, unified messaging app 145 of some embodiments can determine a set of electronic communication services that the sender is currently logged into. In some embodiments, unified messaging app 145 can also determine the electronic communication services that unified messaging app 145 is capable of logging the sender into (e.g., when the username and password of the sender is already stored on user device 100 and is accessible to unified messaging app 145).

At block 414, unified messaging app 145 can identify one or more matches with account addresses (or account identifiers) in a service-specific contacts list for each of the electronic communication services identified at block 412. In some embodiments, unified messaging app 145 can match the partial identifier against account addresses of contacts by retrieving the sender's service-specific contacts list for each of the electronic communication services and determining whether any of the account identifiers on the service-specific contacts list matches the partial identifier input by the user. The sender's service-specific contacts list for each electronic communication service can be stored locally at user device 100 or at a remote server (e.g., managed by a provider of a communication service). The identified matches can then also be included in the set of candidate account addresses to be presented to the sender.

After identifying a set of candidate account addresses for a set of candidate recipients using the received user input, unified messaging app 145 presents a list including the set of candidate account addresses to the sender. In some embodiments, unified messaging app 145 can present the candidate account addresses in the list in a particular order based on a set of preferences (e.g., the user's preferences for particular communication services, the people with whom the user more frequently communicates). Other criteria that can be used to sort the list include whether the sender is currently connected to a particular electronic communication service; the current status of the candidate recipient account (e.g., whether the account is known to be currently online or offline); which electronic communication service or services the sender uses most often, either in general or for a particular recipient; which candidate recipient account the sender has communicated with most recently; which candidate recipient account the sender has communication with most often; and so on. In some embodiments, these decision criteria can also be used to filter the list, e.g., excluding any candidate recipient accounts that are on services the sender is not connected to or excluding candidate recipient accounts that are known to be currently offline.

In some embodiments, unified messaging app 145 can present the set of candidate account addresses to the sender by displaying, for each of the set of candidate account addresses, the associated contact's name (if known), the account identifier (username, phone number, or the like), and the electronic communication service for the account. List 350 in FIG. 3 illustrates one arrangement of information; other embodiments can display the information associated with each of the set of candidate account addresses differently. From the set of candidate account addresses, the sender can select the account address representing the intended recipient.

Figure 6:
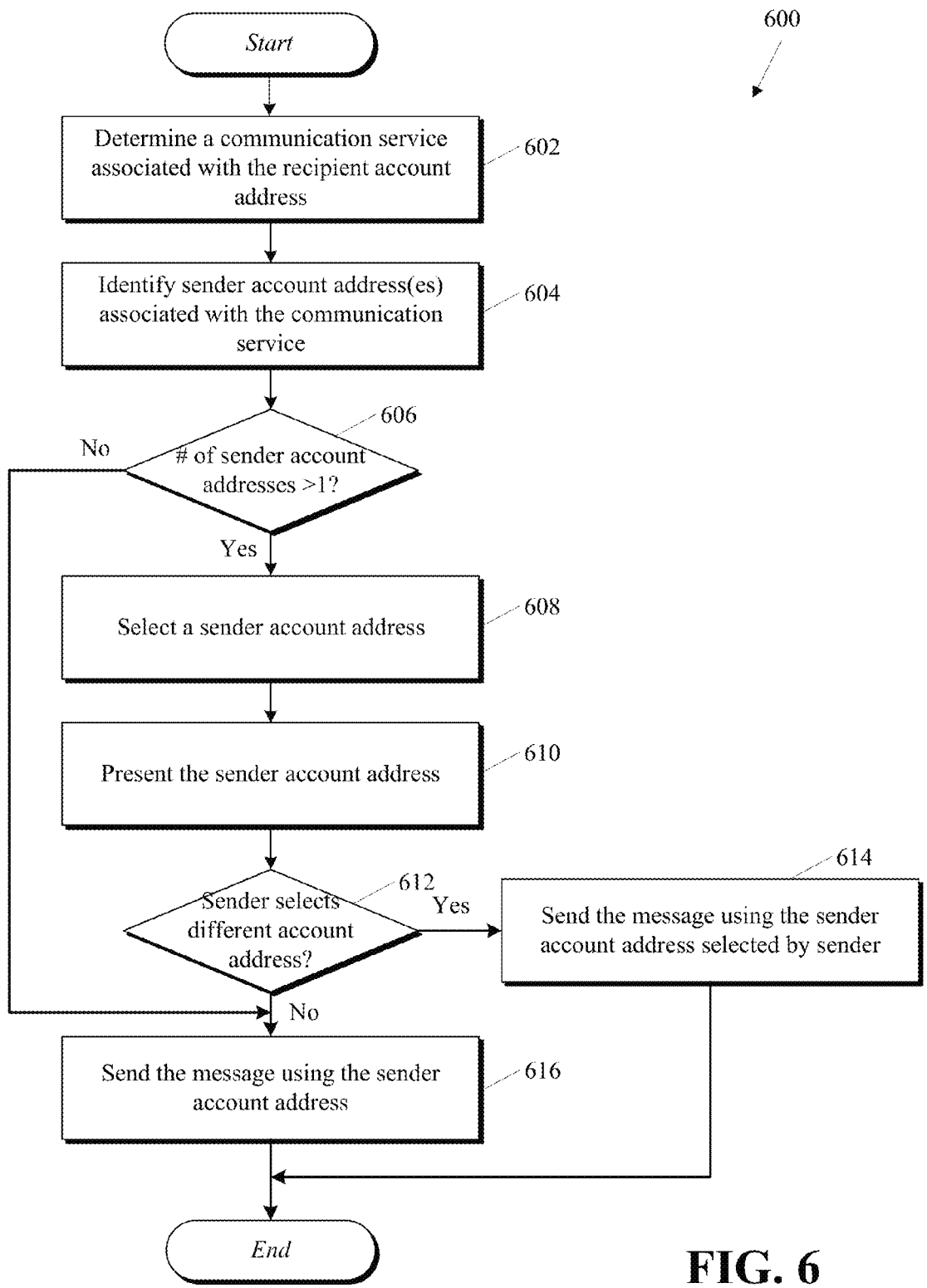
FIG. 6 is a flow diagram of process for determining a sender account from which a message is to be sent in response to a user selection of a particular candidate account address according to an embodiment of the invention.

In some embodiments, a sender account (i.e., the account from which the message is to be sent) is automatically selected by unified messaging app 145 without human intervention. As mentioned, a sender can have several accounts that can be associated with different electronic communication services, and a sender can have multiple accounts on a single electronic communication service. Based on the electronic communication service of the selected recipient account identifier, unified messaging app 145 can determine the appropriate sender account from which to send the message. FIG. 6 is a flow diagram of process 600 for determining a sender account from which a message is to be sent in response to a user selection of a particular candidate account address according to an embodiment of the invention. Process 600 can be implemented, e.g., in user device 100 of FIG. 1 executing unified messaging app 145.

At block 602, unified messaging app 145 can determine an electronic communication service associated with the selected recipient account address. Unified messaging app 145 can determine the electronic communication service associated with the recipient account address in order to determine which sender account to use.

At block 604, unified messaging app 145 can identify a set of sender account addresses associated with the recipient's electronic communication service determined at block 602. The sender can have multiple user identifiers or accounts with a single electronic communication service. For example, on a particular instant messaging service, the sender can use one user identifier for communicating with coworkers and another user identifier for communicating with family and friends. All such accounts can be identified at block 604.

At block 606, unified messaging app 145 can determine whether the number of identified sender account addresses is greater than one. If the number of identified sender account addresses is not greater than one (i.e., if only one sender account address is identified as being associated with the recipient's electronic communication service), then at block 616, unified messaging app 145 can select this account address as the sender account and can send the message using this account address.

If, at block 606, the number of identified sender account addresses is greater than one, then at block 608, unified messaging app 145 can select a sender account address. Various selection criteria can be used. In some embodiments, unified messaging app 145 can retrieve historical information that identifies the sender account address used most frequently to communicate with the candidate account address in the past. In some instances, the sender might use a particular sender account address more often than the other sender account addresses to communicate with the recipient account address (e.g., because the sender uses the particular sender account address to communicate with coworkers or business contacts and the recipient is a business contact). Unified messaging app 145 can then determine the sender account address most frequently used to communicate with the candidate account address as the one to use in sending the message.

While some embodiments select the sender account address that is used most frequently to communicate with the selected recipient account address, some embodiments can select the sender account address using different criteria. For example, some embodiments can select the sender account address from the set of sender account addresses by determining the sender account address most recently used for any communication on the recipient's electronic communication service, the sender account address most recently used to communicate with the selected recipient account address, or the sender account address most frequently used to send any communications on the recipient's electronic communication service.

At block 610, unified messaging app 145 can present the selected sender account address to the sender to provide the sender an opportunity to select a different sender account address from which to send the message. In some embodiments, unified messaging app 145 can present the sender account address to the sender by displaying the sender account address in a "From:" field on the screen image. Prior to sending the message, unified messaging app 145 can allow the sender to select a different account address from the set of sender account addresses associated with the determined electronic communication service.

At block 612, unified messaging app 145 can determine whether the sender selected a different account address. If the sender selected a different account address, then at block 614, unified messaging app 145 can send the message using the sender account address selected by the sender. If the sender does not select a different account address, at block 616, unified messaging app 145 sends the message using the determined sender account address.

As described above, a sender can select a recipient account for a message by providing a partial identifier of the intended recipient and selecting from a list of candidate recipient accounts that match the partial identifier. In embodiments described above, the partial identifier can be a sequence of characters. In some embodiments, the partial identifier can be a characteristic of the intended recipient. For example, the partial identifier can indicate that the intended recipient is a family member, a business contact, a doctor, a person within a particular age group, a coworker, a tennis buddy, a study group member, a person with a physical address within a particular region, etc. Such characteristics can be defined based on any information about the contact that the user has stored. For example, in contact entry 500 of FIG. 5, it can be determined from physical address 504 that Johnny Appleseed lives in Cupertino, Calif. It can be determined from group information in area 520 that Johnny Appleseed is a coworker. In response to receiving a characteristic of an intended recipient (e.g., in search box 330 of FIG. 3), unified messaging app 145 can filter the contacts using the received characteristic to identify the set of candidate account addresses.

In some embodiments, a user of unified messaging app 145 can invite multiple participants to join a communication session. In some instances, a user can select a group of contacts and request to initiate a communication session with the group of contacts. In such instances, unified messaging app 145 can determine an electronic communication service that is accessible to all of the contact in the group (e.g., everyone in the group is logged into or has an account on the electronic communication service) as the electronic communication service to use for the communication session. If there is more than one electronic communication service that is available across all the selected contacts, unified messaging app 145 can determine a most frequently used channel of communication amongst the selected contacts and select that as the electronic communication service to use for the communication session. In some embodiments, if no electronic communication service is determined to be accessible across all the selected contacts, a communication session cannot be established. Some embodiments, however, allow the communication session to be established even when only a majority of the selected contacts are logged into the same electronic communication service.

Figure 7:
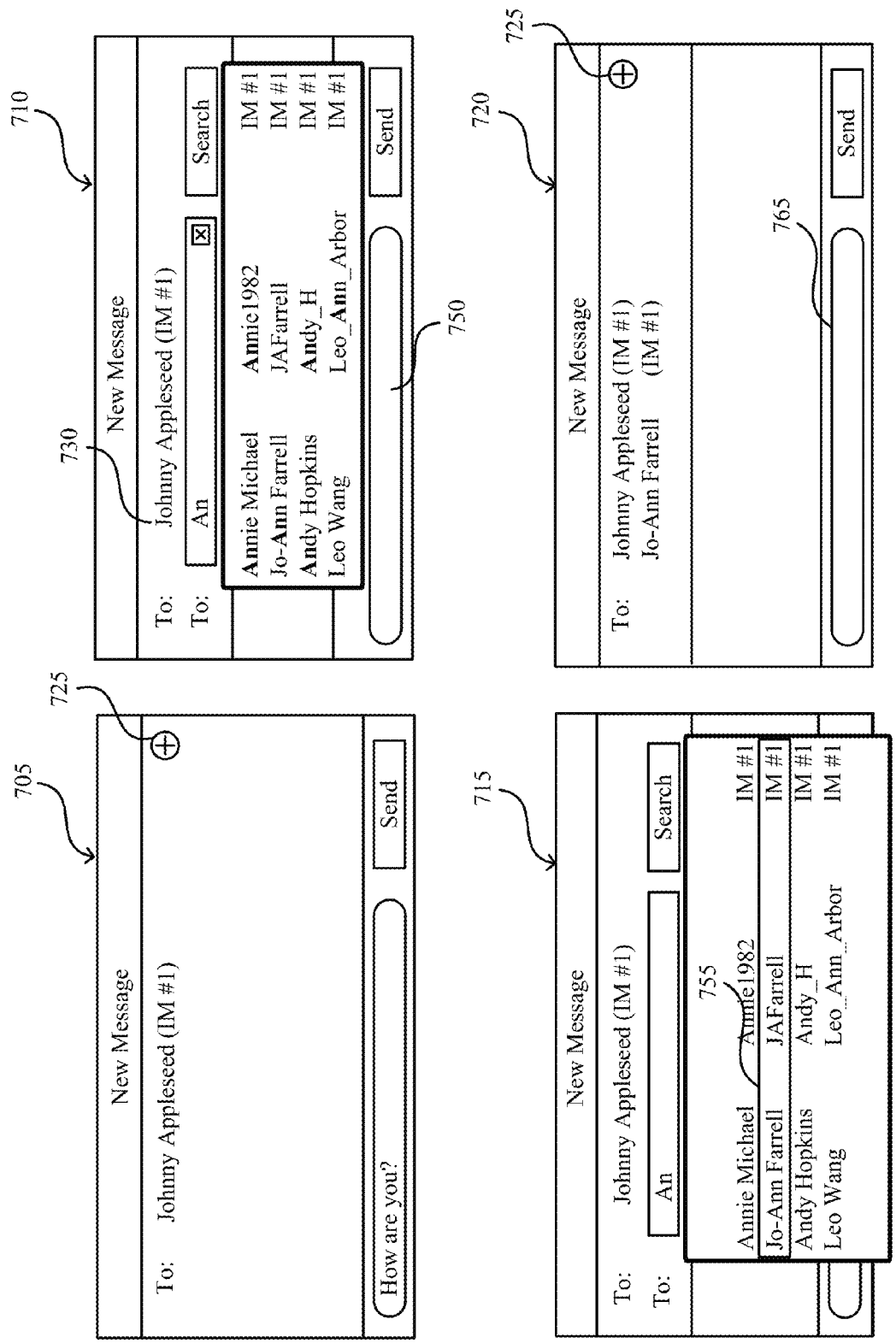
FIG. 7 illustrates an example sequence of screen images for inviting multiple participants to a communication session according to an embodiment of the invention.

In other instances, the user can successively select recipients for a message or decide to add another party to a communication session in progress. Once a sender selects a first recipient for a particular message or a first participant for the communication session, further additions can be limited to those who are also registered and/or logged into to the same electronic communication service that was selected for the first recipient. FIG. 7 illustrates an example sequence of screen images for user device 100 in sending a message to multiple recipients using unified messaging app 145 according to an embodiment of the invention.

FIG. 7 can be described as a sequence of screen images following the sequence of screen images 305-320 in FIG. 3. The initial screen 705 in FIG. 7 is similar to screen image 320, where the sender has selected Johnny Appleseed on service IM #1 as a recipient for the new message. In this screen image 705, the sender can select add-recipient button 725 to add another recipient to the message to Johnny Appleseed.

In response to the user's selection of the add-recipient button 725, another "To:" line appears in screen image 710 to allow the user to identify another recipient. In screen image 710, the sender has input the letters "An" into search box 730 as a partial identifier for the additional recipient. Upon receiving the user input of the partial identifier, unified messaging app 145 of some embodiments can identify a set of account addresses (also referred to as "candidate recipient accounts") that match the user input.

Similar to the embodiment described above, unified messaging app 145 can identify the set of account addresses by matching the received partial identifier against first names, last names, e-mail addresses, and messaging user identifiers of contacts in the database of user contacts. In some embodiments, unified messaging app 145 can also determine whether the partial identifier matches messaging user identifiers of contacts in service-specific contacts lists of the sender. However, since the sender has already selected a particular electronic communication service to be used for Johnny Appleseed (service IM #1), unified messaging app 145 can filter the matches to include only account addresses for electronic communication service IM #1. As shown in screen image 710, a list of candidate account addresses 750 have been identified and displayed to the sender. The list only displays account addresses that use electronic communication service IM #1.

In screen image 715, the sender has selected one of the set of candidate account addresses for the intended recipient. As shown, the selected candidate account address 755 is highlighted, indicating that the sender has made a selection. In screen image 720, the second recipient is added to the "To:" line. The sender can select add recipient button 725 again to add another recipient or create a message to be sent, e.g., by typing in box 765. A similar process can be used to add participants to an established communication session, provided that the electronic communication service supports communication sessions with more than two participants.

In some embodiments, a communication application such as unified messaging app 145 can provide the functionality to facilitate a communication session between two or more participants. Unified messaging app 145 can allow a sender to conveniently identify an intended recipient account address across multiple electronic communication services to send a message. Unified messaging app 145 of some embodiments can determine a sender account from which to send the message based on the electronic communication service associated with the selected recipient account addresses. Further, unified messaging app 145 can facilitate a communication session for a group of three or more participants and determine an appropriate electronic communication service for the communication session. The user can enjoy a seamless communication experience with any of her contacts on any electronic communication service they happen to be connected to, without having to switch applications or adapt to different user interfaces.

The communication application in some embodiments can provide other functionality including the ability to display a communication history between a first user and a second user to the first user. In response to a user request for communication history between a user and another user, unified messaging app 145 of some embodiments can aggregate and present a communication history between two users, including communication that took place across multiple electronic communication services.

Figure 8:
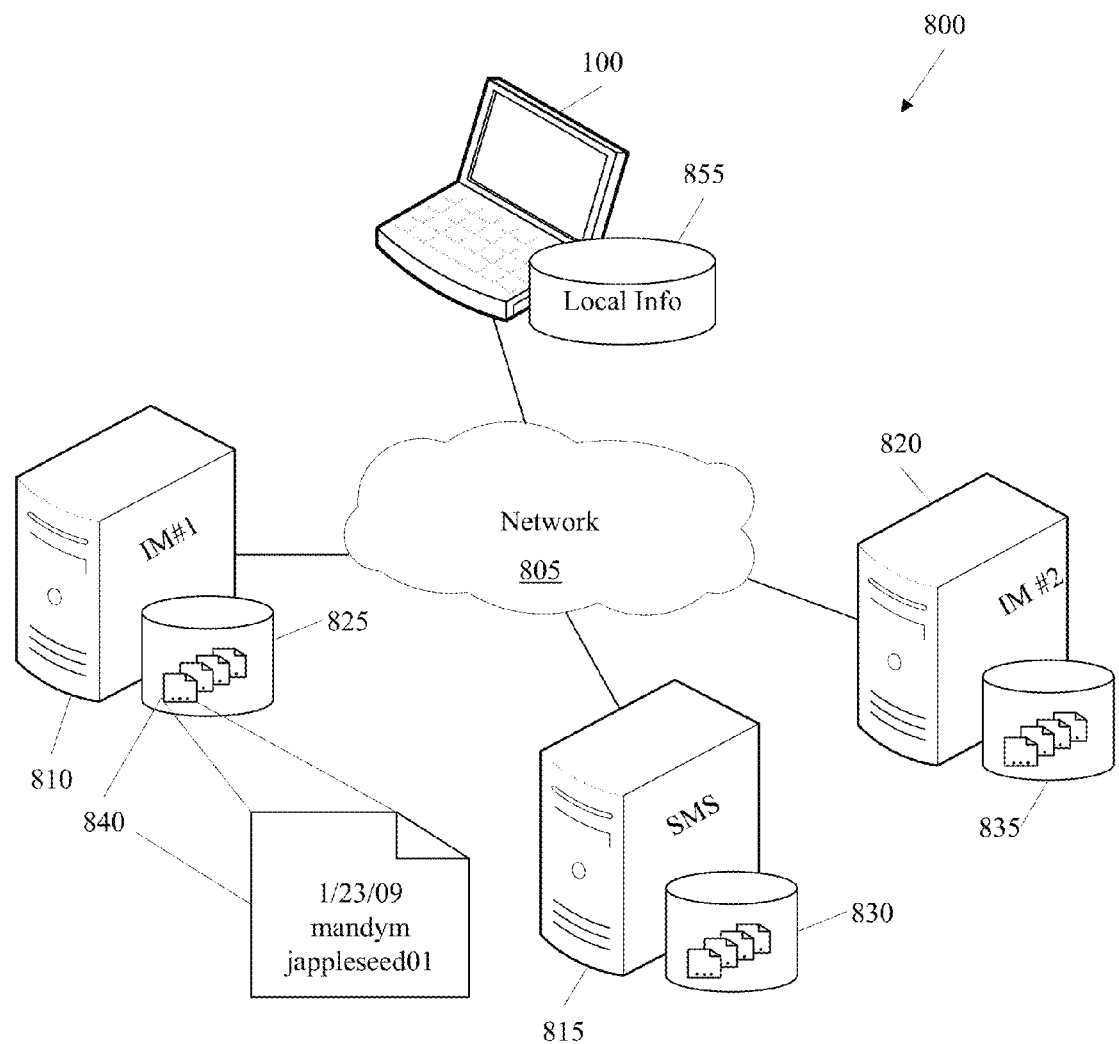
FIG. 8 is a system diagram that illustrates local and remote storage of electronic communication session files that can be located and aggregated to generate a communication history between users.

Electronic communication services can be hosted by different providers and/or on different servers, and some electronic communication services can maintain records of past communication, e.g., e-mail archives or chat history files. FIG. 8 is a system diagram 800 that illustrates local and remote storage of electronic communication session files that can be located and aggregated to generate a communication history between users. In some embodiments, user device 100 can communicate via a wide area network 805 (e.g., the Internet) with various servers. As shown, the servers can include instant messaging service #1 server 810, SMS service server 815, and instant messaging service #2 server 820. Other servers (not shown) hosted by other providers of electronic communication services can also be connected to network 805. In this embodiment, each of servers 810, 815, and 820 stores communication history files in an associated data repository 825, 830, 835.

A representative communication file is shown as chat session file 840. File 840 can be a transcript of a chat session between two (or more) users and can be retrievable from data repository 825 by reference to various parameters such as the date, time, and/or participants' user names (or other account identifiers). In some embodiments, the date and time associated with the file can include a range of times over which communications occurred (e.g., all communications from the same day can be stored in one file, or if the communication service defines a session, the range of times can correspond to the duration of a session). File 840 can store a record of each message that was sent by either party during the relevant time range, and each message can have a times tamp indicating when it was actually sent. In some embodiments, file 840 can include text data, audio data, video data, image data, or any other data representing the communication that took place. A communication file can include any number of messages; in some instances, each message may be in a separate file, or a single file may contain many messages.

Upon receiving a user request for a communication history between the first user and the second user, unified messaging app 145 can communicate with servers 810, 815, 820 in order to identify and obtain access to the communication session files associated with the two users. In some embodiments, unified messaging app 145 can request all session history files associated with accounts belonging to the two users.

It will be appreciated that the system of FIG. 8 is illustrative and that variations and modifications are possible. In some embodiments, communication files can be stored locally (e.g., in local information store 855 of FIG. 8) in addition to or instead of being stored on remote servers.

Figure 9:
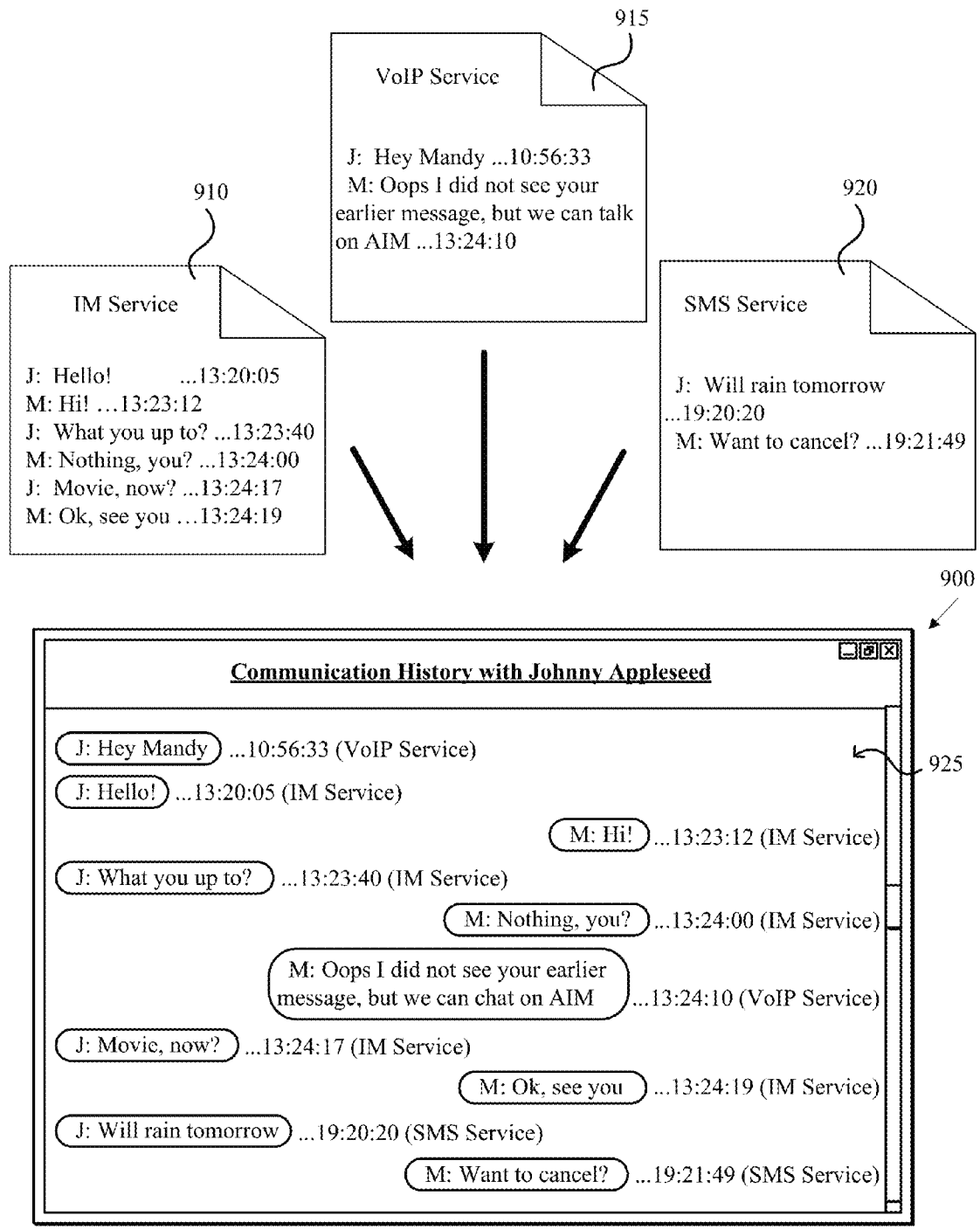
FIG. 9 is an example of a creation of a page including communication history by aggregating multiple communication session files according to an embodiment of the present invention.

FIG. 9 is an example of creating a communication history page 900 by aggregating multiple communication session files according to an embodiment of the present invention. In this example, a user has requested the communication history with another user (Johnny Appleseed). In response to receiving the user's request, user device 100 can obtain communication session files between the user and the other user. The files can be obtained for any electronic communication service that the requesting user has used to communicate with the other person. Different files can be obtained for different services, and one or more files can be obtained from the same service. In the example of FIG. 9, the communication history includes three communication session files: a chat session file from an instant message service 910, an instant message/VOIP service 915, and a text message (SMS) service 920. While only three communication session files are retrieved for this particular example, there could be many more session files included in two users' communication history across various electronic communication services. Session files can be stored locally at user device 100 and/or remotely (e.g., at servers 810, 815, 820 as shown in FIG. 8). Remotely stored files can be retrieved in response to a user request.

In some embodiments, unified messaging app 145 can arrange individual communications from the communication session files in an order (e.g., a chronological order) such that the generated page displays the communication history in the order in which the communications between the two users took place. As shown in FIG. 9, each communication line (corresponding to a message) in a communication session file can have a timestamp indicating when that message was sent. Based on the timestamps, unified messaging app 145 can sort the communication lines from all the communication session files across the different communication services and present a single page with the entire communication history arranged in chronological order. (In some embodiments, the communication lines can be sorted in a reverse chronological order or any other order, as desired.)

Page 900 in FIG. 9, which is generated by aggregating communication session files from instant message service 910, VOIP service 915, and text message service 920, shows the aggregated communication history between the user and Johnny Appleseed. The aggregated communication history shows all chat lines and text exchanges between the user and Johnny Appleseed, sorted by timestamps, without regard for which service was used. Because "Hey Mandy" from VOIP service 915 has a timestamp of 10:56:33 and is the first communication between the user and Johnny Appleseed, it is displayed as the first chat line in the aggregated communication history. The next communication occurred when Johnny Appleseed sent "Hello!" to the user via instant message service 910 at 13:20:05. Hence, it is displayed as the second chat line in the aggregated communication history. In this way, all the chat lines from instant message service 910 and VOIP service 915 are sorted by each of their associated timestamp. Communication lines from the different communication session files can be interleaved depending on each communication line's timestamp. Moreover, page 900 also includes the communication history between the user and Johnny Appleseed from SMS service 920. As indicated by their associated timestamps, the text messages were exchanged later in the day. Consequently, the text message exchanges are displayed at the bottom of page 900, below the communication history from instant message service 910 and VOIP service 915.

It will be appreciated that page 900 is illustrative and that variations and modifications are possible. In some embodiments, messages sent using different services can be visually distinguished from each other, e.g., by font, background color, service-identifying annotations (as shown in FIG. 9), and so on. In some embodiments, a communication history can include other message formats in addition to or instead of text. For example, if a record of an audio conversation is available, the record can be inserted at an appropriate point in the communication history page (e.g., based on a timestamp associated with the beginning or end of the record). This can be indicated, e.g., by providing a visual cue at the appropriate location in the page and/or playback control elements to allow the user to play the audio. Video can be handled similarly, and a frame from the video can be included as an indicator that video is available.

As described, some embodiments can also sort the communication history in an order based on each file's timestamp or timestamps associated with various communication units defined by the service. A "communication unit" can include, e.g., a single message, a group of messages, all messages within a certain time interval, a block of conversation without a pause longer than twenty seconds, etc. This allows the user who requested the communication history to be able to readily view the entire communication history between the two users in a single page, regardless of the account addresses or the communication service used by either party when each communication took place. Further, the user can perform searches within the page to identify a dialogue the user is looking for, instead of having to open each communication session file and search the content of each file individually. In some instances, the communication history can be quite long and might not fit in the available display space. Page 900 can be scrollable to allow the user to view different portions of the history.

Figure 10:
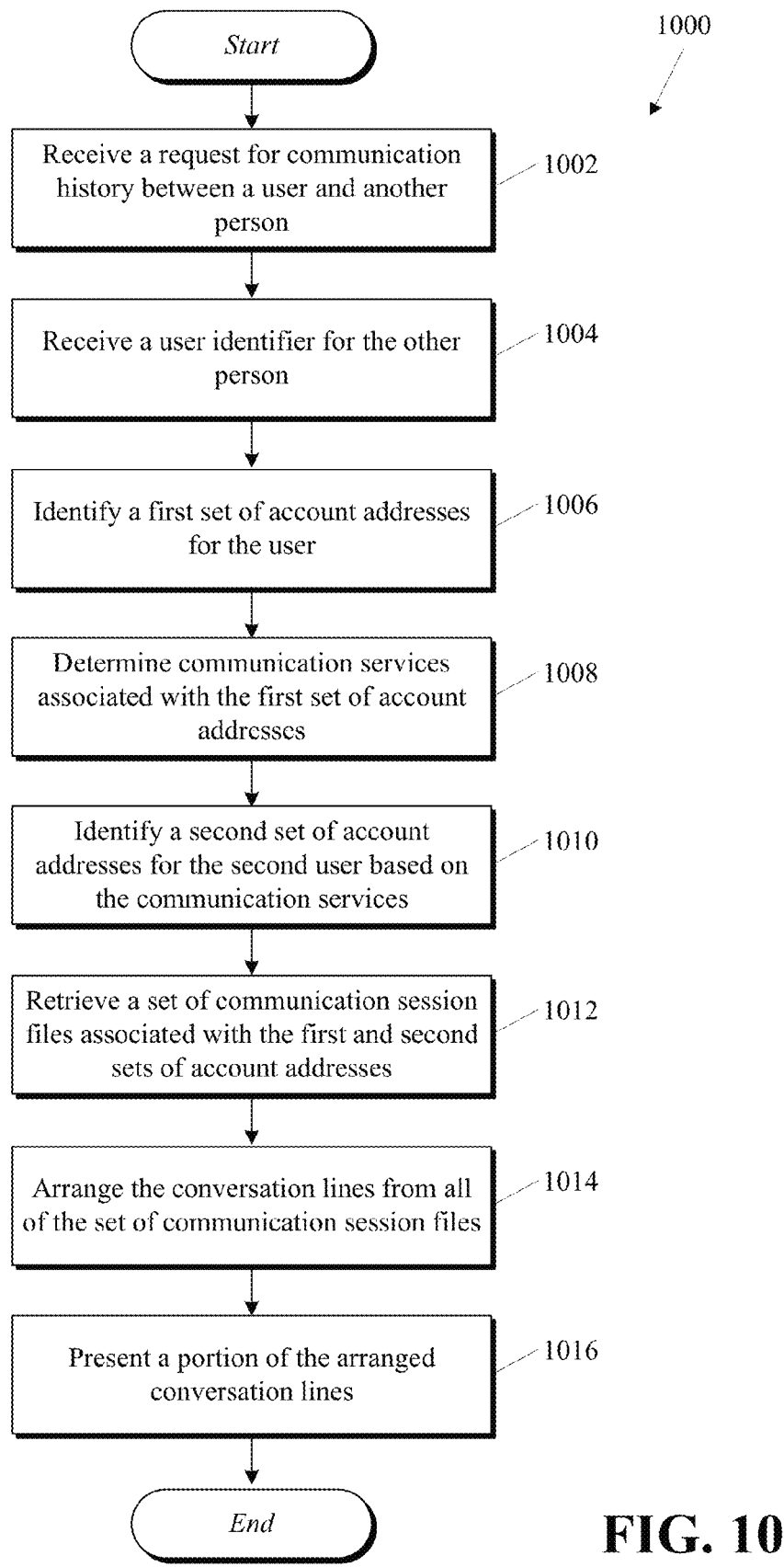
FIG. 10 is a flow diagram of a process for aggregating a communication history that stores communications between two users according to an embodiment of the present invention.

FIG. 10 is a flow diagram of a process 1000 for aggregating a communication history that stores communications between two users according to an embodiment of the present invention. Process 1000 can be implemented, e.g., in user device 100 of FIG. 1 executing unified messaging app 145.

At block 1002, unified messaging app 145 can receive a request for a communication history between a user and another person. The user can be a user of user device 100 requesting to view a communication history between herself and the other person. In some embodiments, the user can request to view the communication history by selecting a button in unified messaging app 145, making a selection from a pull down menu, etc. The user can specify one or more people with whom she has communicated in the past and request the communication history (e.g., video chat data, instant message exchanges, voice chat recordings, etc.) between them.

At block 1004, unified messaging app 145 can receive a user identifier for the other person. In some embodiments, the user identifier for the other person can be received as part of the received request for the communication history. Any of the recipient identification techniques described above can be used to assist the user in providing the other person's user identifier.

At block 1006, unified messaging app 145 can identify a set of account addresses for the requesting user. In some embodiments, unified messaging app 145 can identify a set of account addresses for the user by accessing program files on user device 100 that store this information for unified messaging app 145. In some embodiments, the user's account address information is stored in a program file when the user creates and registers a new account with any one of an electronic communication service. Some embodiments allow the user to input this information into unified messaging app 145, which can store the information along with other user-specific settings. Further, some embodiments track the user's account address information in a remote server, and this server can be accessed when unified messaging app 145 requests the information.

At block 1008, unified messaging app 145 can determine a set of communication services associated with the first set of account addresses. This set can include any communication service that is associated with at least one of the requesting user's account addresses. In some embodiments, some services can be excluded from the set, e.g., if the service does not maintain communication session records or if the user has indicated that certain services (e.g., e-mail) should be excluded.

At block 1010, unified messaging app 145 can identify a second set of account addresses for the other person. In some embodiments, unified messaging app 145 can determine the second set of account addresses for the other person by searching user contacts database 150 (also referred to as an address book). For example, the user can identify the other person by providing a name or an account address or by selecting a record from the user's address book, and unified messaging app 145 can retrieve all of the contact's account addresses from the address book. Referring to FIG. 5, if the received user identifier at block 1004 is "Johnny Appleseed" (actual name) or one of his accounts, e.g., johnny@co.com, then unified messaging app 145 can search the address book to find matching entry 500 and extract all of the account addresses, including account addresses 510, 506, 508, 512, 518, 514, and 516. Some embodiments can filter the extracted account addresses to include only accounts or services that are in the set defined at block 1006.

At block 1012, unified messaging app 145 can retrieve a set of communication session files associated with the first and second sets of account addresses, either from the servers or local storage. In some embodiments, unified messaging app 145 can identify all instances where the user and the other person both have accounts on the same electronic communication service. For each such pair of accounts, unified messaging app 145 can request, from the server of that electronic communication service, all the session files for that pair of account identifiers and retrieve any session files containing communications between those two accounts. In instances where the user or the other person (or both) has multiple accounts on a single service, multiple pairs of account identifiers can be used to obtain session files for that service. In instances where session files are stored locally, unified messaging app 145 can obtain the session files from local storage rather than requesting them from a server.

At block 1014, unified messaging app 145 can arrange the conversation units or lines from all of the retrieved communication session files in an order based on the associated timestamps. As described above with reference to FIG. 9, unified messaging app 145 can arrange the conversation line in a chronological order such that all of the conversation lines in all the communication session files are displayed in a single page and ordered based on their respective timestamps. This allows the user to view the communication history with the other person chronologically across all the communication services.

At block 1016, unified messaging app 145 can present at least a portion of the arranged conversation lines to the user. The arranged conversation lines can be presented in a single page or window where the user can view the entire communication history between the first user and the second user by simply scrolling through the page.

Systems and methods in accordance with various embodiments can present a communication history between two or more users using a page in a window, in response to receiving a user request for a communication history. In some embodiments, unified messaging app 145 can load communication history retrieved from various servers (e.g., servers 810, 815, and 820) into system memory and display the communication history to the user. Unified messaging app 145 of some embodiments can provide a seamless scrolling experience for the user if the communication lines currently visible to the user along with some adjacent lines are already loaded into system memory when the user is scrolling through the page. However, in some embodiments, the memory constraints can prevent unified messaging app 145 from loading the entire communication history into system memory. Some embodiments implement intelligent memory caching by dynamically loading and unloading portions of the communication history page into and out of system memory, based at least in part on the portion within the page that the user is viewing at any given time.

An example of dynamic loading and unloading of portions of a communication history page is illustrated in FIGS. 11A and 11B, which are representations of a communication history page 1105 at two different times. In FIGS. 11A and 11B, page 1105 represents the entire communication history between two users. In some embodiments, page 1105 can be generated using techniques described above. For convenience of description, page 1105 is shown as being divided into a number of cells 1102, each corresponding to a portion of the communication history. A cell 1102 can be, e.g., a fixed number of conversation lines (e.g., one hundred lines) or a fixed amount of data (such as a page of system memory).

In FIGS. 11A and 11B, an empty cell (e.g., cell 1102(1) of FIG. 11A) indicates that the corresponding portion of page 1105 is not currently loaded in memory. A cell containing lines (e.g., cell 1102(15) of FIG. 11A) indicates that corresponding portion is currently loaded in memory. A cell with the notation "Now loading . . . " (e.g., cell 1102(8) in FIG. 11A) indicates that the corresponding portion is in the process of being loaded into memory. A cell with the notation "Now unloading . . . " (e.g., cell 1102(10) in FIG. 11B) indicates that the corresponding portion is in the process of being unloaded from memory. Windows 1115 and 1120 indicate which portion of page 1105 is currently being displayed in FIGS. 11A and 11B respectively.

In some embodiments, the number of cells 1102 that are in memory at any given time can be constant (except for possible transient fluctuations due to loading and unloading) while the user is viewing communication history page 1105. The number can be large enough to provide enough information to fill the display area where the history is presented (five cells 1102 in the example of FIG. 11), and in some embodiments the number can be larger, e.g., to allow additional portions of page 1105 to be pre-loaded in advance of the user scrolling the page. As the user scrolls through page 1105 page, new cells 1102 are loaded into memory and other cells 1102 are unloaded from memory to keep the total memory usage essentially constant.

For example, FIG. 11A can correspond to the time when page 1105 is first displayed in response to a user request. In this embodiment, page 1105 can include conversation lines arranged in chronological order, and the initial display shows the most recent lines (which are at the bottom of page 1105). Cells 1102(10)-1102(15), which correspond to portions of page 1105 that are being displayed, are in memory. In addition, cell 1102(9), which corresponds to a portion of page 1105 just outside the visible portion, is also in memory, and the next two cells 1102(7) and 1102(8) are loading. If the user begins to scroll up, the next several portions of page 1105 are (or will soon be) ready to display.

FIG. 11B can correspond to a later time, after the user has begun to scroll up. Now the portion of page 1105 within window 1120 is visible. The corresponding cells 1102(4)-1102(9) have been loaded. Cell 1102(10), which has scrolled out of view, remains loaded; if the user starts scrolling back down, this portion of page 1105 will be ready to display. Cells 1102(11) and 1102(12), which are farther out of view, are being unloaded, and cells 1102(13)-1102(15) are now empty. Cells 1102(2) and 1102(3) are now loading, and their content will be ready to display if the user continues to scroll up. As can be seen by comparing FIGS. 11A and 11B, the total amount of memory in use is essentially the same at both times. (In this example, unloading cells is a fast process.)

Dynamic loading and unloading behavior can be optimized in an implementation-dependent manner. For example, the size of a cell can be selected as desired, and the maximum number of cells to load can also be selected as desired. In some embodiments, the cell size can be defined as a fixed number of messages or a fixed amount of content. Choices of cell size and maximum number of cells to load can depend on considerations such as loading speed, rendering speed, the amount of memory available, and limitations on the acceptable delay in displaying different portions of the communication history in response to user scrolling. In some embodiments, considerations of such as font size, display resolution, and window size, which determine how much of the content will be simultaneously visible, can also be considered when selecting a cell size and maximum number of cells to load.

In some embodiments, certain portions of the communication history (e.g., one or more cells corresponding to the most recent communications) can be kept in memory at all times while other portions of the history are dynamically loaded and unloaded.

In addition, the type of data that is stored in memory for a loaded cell can be varied. In some embodiments, loading includes storing just the message data in system memory, with rendering and formatting processes to generate a viewable image from the message data being performed in real time. In other embodiments, loading can include performing the rendering and formatting processes so that the cell is stored in memory as an image block or other data that is directly displayable. In some embodiments, loading can also include dynamically building portions of an aggregated communication history from session files (e.g., as described above). In some embodiments, an aggregated communication history can be built once and stored (e.g., in a cache or local data file), and loading can include transferring portions of this stored history data to system memory to enable faster access. Dynamic loading and unloading is optional; in some embodiments, the entire communication history can be loaded into system memory at once.

A communication application of some embodiments can present a communication history between two or more users where the communication history includes communications between the two or more users across all the electronic communication services they have used for communication in the past. The communication application can provide the user scrolling through a window displaying the communication history a seamless user experience by performing intelligent memory management. Due to the memory limitations, the communication application dynamically loads and unloads aggregated communication history as the user scrolls to different portions of the window.

While the invention has been described with respect to specific embodiments, one skilled in the art will recognize that numerous modifications are possible. For example, embodiments described above can provide unified messaging (or unified communication) across a broad range of electronic communication services including e-mail, instant messaging, text messaging, SMS, VOIP, and so on, and the communication can incorporate text, audio, video, images, or any other form of communication. It is to be understood that not all electronic communication services need be supported, and different embodiments can support different combinations of services mentioned herein and/or other electronic communication services.

A user can have any number of contacts and can communicate with a particular contact via any combination of the available services. In some instances, a user can use a unified messaging application to communicate with parties for whom no record exists in the user's address book.

Further, presentation of aggregated communication history can be limited to services that provide records of past communications, and the completeness of an aggregated communication history can be limited by the availability or unavailability of usable records. Communication history can also be aggregated across a subset of the available records, e.g., based on a date range or a user-selected subset of the electronic communication services.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media: suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
receiving, by a computer that includes a display, a request for a communication history between a first user and a second user, the communication history including communications between the first user and the second user across a plurality of electronic communication services associated with different user identifiers for the first user;
in response to receiving the request, obtaining a set of communication session information for the plurality of electronic communication services, including a first communication history and a second communication history, wherein:
the first communication history includes a plurality of messages between the first user and the second user via a first communication service, of the plurality of electronic communication services, in which the first user is identified with a first user identifier that serves to uniquely identify the first user to the first communication service and the second user is identified with a second user identifier that serves to uniquely identify the second user to the first communication service, the first communication history being obtained without regard to messages in the second communication history; and
the second communication history includes a plurality of messages between the first user and the second user via a second communication service, of the plurality of electronic communication services, in which the first user is identified with a third user identifier that serves to uniquely identify the first user to the second communication service independently of the first user identifier and is different from the first user identifier and the second user is identified with a fourth user identifier that serves to uniquely identify the second user to the second communication service independently of the second user identifier and is different from the second user identifier, the second communication history being obtained without regard to messages in the first communication history;
generating, by the computer, a combined communication history based on timestamps associated with messages from the first communication history and the second communication history, wherein generating the combined communication history includes aggregating the messages from the first communication history and the second communication history into the combined communication history based on the timestamps associated with the messages, wherein the plurality of messages between the first user and the second user in the first communication history and the plurality of messages between the first user and the second user in the second communication history are interleaved based on the timestamps; and
in conjunction with generating the combined communication history, concurrently displaying, on the display:
at least a portion of the combined communication history including the aggregated and interleaved messages; and
a communication creation affordance for sending a new communication from the first user to the second user via one of the plurality of communication services.

2. The method of claim 1, wherein the request is received from the first user and includes the second identifier for the second user, the method further comprising:
determining, by the computer, one or more additional identifiers for the second user, wherein obtaining the set of communication session information includes obtaining a communication session file associated with one of the one or more additional identifiers of the second user.

3. The method of claim 2, wherein the one or more additional identifiers for the second user is determined by searching a database of user contacts and identifying a set of identifiers associated with the second identifier for the second user, the one or more additional identifiers being associated with different ones of the plurality of electronic communication services.

4. The method of claim 1, wherein the messages in the combined communication history are arranged in a chronological order.

5. The method of claim 1, wherein obtaining access to the set of communication session information for the plurality of electronic communication services includes:
identifying a first set of user identifiers associated with the first user, each of the first set of user identifiers being associated with one of the plurality of electronic communication services; and
identifying, for the plurality of electronic communication services, a second set of user identifiers associated with the second user, wherein the set of communication session information is obtained by retrieving communication session files associated with at least one user identifier in the first set of user identifiers and at least one user identifier in the second set of user identifiers.

6. The method of claim 1, wherein all the messages in the combined communication history are provided in a single file, wherein the method further comprises:
displaying a portion of the messages in a window in a user interface of the computer, wherein the portion of the messages displayed corresponds to a portion of the file.

7. The method of claim 1, wherein the combined communication history includes at least one of textual data, audio data, video data, image data, or a combination thereof.

8. The method of claim 1, wherein the set of communication session information includes a first subset of communication session files that are obtained locally and a second subset of communication session files that are obtained from a remote server accessible through an application programming interface (API).

9. The method of claim 1, wherein the plurality of electronic communication services includes at least one of e-mail, instant messaging, Short Message Service (SMS), or Voice over Internet Protocol (VoIP).

10. A non-transitory computer readable storage medium encoded with program instructions that, when executed, cause a processor in a computing device including a display to execute a method, the method comprising:

receiving a request for a communication history between a first user and a second user, the communication history including communications between the first user and the second user across a plurality of electronic communication services associated with different user identifiers for the first user;

in response to receiving the request, obtaining a set of communication session information for the plurality of electronic communication services, including a first communication history and a second communication history, wherein:

the first communication history includes a plurality of messages between the first user and the second user via a first communication service, of the plurality of electronic communication services, in which the first user is identified with a first user identifier that serves to uniquely identify the first user to the first communication service and the second user is identified with a second user identifier that serves to uniquely identify the second user to the first communication service, the first communication history being obtained without regard to messages in the second communication history; and the second communication history includes a plurality of messages between the first user and the second user via a second communication service, of the plurality of electronic communication services, in which the first user is identified with a third user identifier that serves to uniquely identify the first user to the second communication service independently of the first user identifier and is different from the first user identifier and the second user is identified with a fourth user identifier that serves to uniquely identify the second user to the second communication service independently of the second user identifier and is different from the second user identifier, the second communication history being obtained without regard to messages in the first communication history;

generating a combined communication history based on timestamps associated with messages from the first communication history and the second communication history, wherein generating the combined communication history includes aggregating the messages from the first communication history and the second communication history into the combined communication history based on the timestamps associated with the messages, wherein the plurality of messages between the first user and the second user in the first communication history and the plurality of messages between the first user and the second user in the second communication history are interleaved based on the timestamps; and in conjunction with generating the combined communication history, concurrently displaying, on the display:

at least a portion of the combined communication history including the aggregated and interleaved messages; and a communication creation affordance for sending a new communication from the first user to the second user via one of the plurality of communication services.

11. The computer readable storage medium of claim 10, wherein the request is received through at least one of a keyboard input, a gesture input, or a voice command.

12. The computer readable storage medium of claim 10, wherein the different ones of the plurality of electronic communication services include different electronic communication services that are provided by different service providers.

13. The computer readable storage medium of claim 11, wherein receiving the request for the communication history between the first user and the second user includes receiving a selection of a user identifier of the second user in any one of the plurality of electronic communication services.

14. The computer readable storage medium of claim 10, wherein receiving the request for the communication history between the first user and the second user includes receiving a selection of a user identifier, for the second user, of one or more identifiers stored in a database of user contacts associated with the first user.

15. An electronic device, comprising:

a display;

a processor;

a memory device coupled to the processor, the memory device including instructions to be executed for facilitating communication, wherein the instructions, when executed by the processor, cause the processor to:

receive a request for a communication history between a first user and a second user, the communication history including communications between the first user and the second user across a plurality of electronic communication services associated with different user identifiers for the first user;

in response to receiving the request, obtain a set of communication session information for the plurality of electronic communication services, including a first communication history and a second communication history, wherein:

the first communication history includes a plurality of messages between the first user and the second user via a first communication service, of the plurality of electronic communication services, in which the first user is identified with a first user identifier that serves to uniquely identify the first user to the first communication service and the second user is identified with a second user identifier that serves to uniquely identify the second user to the first communication service, the first communication history being obtained without regard to messages in the second communication history; and the second communication history includes a plurality of messages between the first user and the second user via a second communication service, of the plurality of electronic communication services, in which the first user is identified with a third user identifier that serves to uniquely identify the first user to the second communication service independently of the first user identifier and is different from the first user identifier and the second user is identified with a fourth user identifier that serves to uniquely identify the second user to the second communication service independently of the second user identifier and is different from the second user identifier, the second communication history being obtained without regard to messages in the first communication history;

generate a combined communication history based on timestamps associated with messages from the first communication history and the second communication history, wherein generating the combined communication history includes aggregating the messages from the first communication history and the second communication history into the combined communication history based on the timestamps associated with the messages, wherein the plurality of messages between the first user and the second user in the first communication history and the plurality of messages between the first user and the second user in the second communication history are interleaved based on the timestamps; and in conjunction with generating the combined communication history, concurrently display, on the display:
at least a portion of the combined communication history including the aggregated and interleaved messages; and
a communication creation affordance for sending a new communication from the first user to the second user via one of the plurality of communication services.

16. The electronic device of claim 15, wherein the messages in the combined communication history are provided on a page in a user interface of the electronic device, wherein the instructions further cause the processor to:
display a portion of the page that corresponds to a portion of the messages in the combined communication history.

17. The electronic device of claim 16, wherein at least the portion of the messages is loaded, and the instructions further cause the processor to:
receive an indication that the portion of the page has changed to another portion of the page; and
in response to receiving the indication, loading another portion of the messages corresponding to the another portion of the page.

18. The electronic device of claim 15, wherein the messages in the combined communication history are arranged in a reverse chronological order.

19. The electronic device of claim 15, wherein the set of communication session information is obtained through one or more application programming interfaces (APIs).

20. The computer readable storage medium of claim 10, wherein all the messages in the combined communication history are provided in a single file, wherein the method further comprises:
displaying a portion of the messages in a window in a user interface of the computing device, wherein the portion of the messages displayed corresponds to a portion of the file.

21. The computer readable storage medium of claim 10, wherein obtaining the set of communication session information comprises:
determining communication history that include at least one user identifier of the first user and at least one user identifier of the second user.

22. The method of claim 1, wherein providing the combined communication history includes loading a portion of the messages in the combined communication history that corresponds to a portion of a page that is being viewed, and wherein the method further comprises:
preloading an additional portion of the messages prior to the page being scrolled such that the additional portion of the messages would be ready for display; and
unloading a portion of the messages and loading another portion of the messages based at least in part upon a scrolling of the page.

23. The method of claim 1, wherein the first communication history includes at least one message sent by the first user to the second user via the first communication service and at least one message sent by the second user to the first user via the first communication service, and the second communication history includes at least one message sent by the first user to the second user via the second communication service and at least one message sent by the second user to the first user via the second communication service.

24. The method of claim 1, wherein the plurality of messages in the first communication history is visually distinguished in the combined communication history from the plurality of messages in the second communication history.

25. The computer readable storage medium of claim 10, wherein the first communication history includes at least one message sent by the first user to the second user via the first communication service and at least one message sent by the second user to the first user via the first communication service, and the second communication history includes at least one message sent by the first user to the second user via the second communication service and at least one message sent by the second user to the first user via the second communication service.

26. The computer readable storage medium of claim 10, wherein the plurality of messages in the first communication history is visually distinguished in the combined communication history from the plurality of messages in the second communication history.

27. The electronic device of claim 15, wherein the first communication history includes at least one message sent by the first user to the second user via the first communication service and at least one message sent by the second user to the first user via the first communication service, and the second communication history includes at least one message sent by the first user to the second user via the second communication service and at least one message sent by the second user to the first user via the second communication service.

28. The electronic device of claim 15, wherein the plurality of messages in the first communication history is visually distinguished in the combined communication history from the plurality of messages in the second communication history at least by font and/or color.

29. The method of claim 1, wherein displaying at least the portion of the communication history includes concurrently displaying messages from the first user and the second user arranged relative to different sides of a communication history region, including:
displaying the messages from the first user arranged relative to a first side of the communication history region, wherein the messages from the first user that are arranged relative to the first side of the communication history region include:
a communication from the first user via the first communication service; and
a communication from the first user via the second communication service; and
displaying the messages from the second user arranged relative to a second side of the communication history region that is different from the first side of the communication history region, wherein the messages from the second user that are arranged relative to the second side of the communication history region include:
a communication from the second user via the first communication service; and
a communication from the first user via the second communication service.

30. The method of claim 1, wherein the communication creation affordance includes a text entry region and a message sending affordance for sending a new communication that includes text entered in the text entry region.

\* \* \* \* \*

UNITED STATES PATENT AND TRADEMARK OFFICE
CERTIFICATE OF CORRECTION

| | | |
|---|---|---|
| PATENT NO. | : 9,300,621 B2 | Page 1 of 1 |
| APPLICATION NO. | : 13/464807 | |
| DATED | : March 29, 2016 | |
| INVENTOR(S) | : Guzman Suarez et al. | |

It is certified that error appears in the above-identified patent and that said Letters Patent is hereby corrected as shown below:

In the claims, claim 5, col. 24, line 48, please delete "obtaining access to the" and insert --obtaining the--.

Signed and Sealed this
Twenty-first Day of June, 2016

Michelle K. Lee
*Director of the United States Patent and Trademark Office*